(12) United States Patent
Ye et al.

(10) Patent No.: US 12,055,472 B2
(45) Date of Patent: Aug. 6, 2024

(54) METHOD FOR CORRECTING A BLOOD CELL PARAMETER, BLOOD SAMPLE ANALYZER AND STORAGE MEDIUM

(71) Applicant: Shenzhen Mindray Bio-Medical Electronics Co., Ltd., Shenzhen (CN)

(72) Inventors: Bo Ye, Shenzhen (CN); Guanzhen Wang, Shenzhen (CN); Jin Li, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 519 days.

(21) Appl. No.: 17/356,332

(22) Filed: Jun. 23, 2021

(65) Prior Publication Data

US 2021/0318222 A1 Oct. 14, 2021

Related U.S. Application Data

(63) Continuation of application No. PCT/CN2018/125095, filed on Dec. 28, 2018.

(51) Int. Cl.
*G01N 15/10* (2024.01)
*G01N 15/00* (2006.01)
*G01N 15/01* (2024.01)
*G01N 15/14* (2006.01)

(52) U.S. Cl.
CPC .............. *G01N 15/10* (2013.01); *G01N 15/01* (2024.01); *G01N 2015/03* (2013.01); *G01N 2015/1486* (2013.01); *G01N 2015/1493* (2013.01)

(58) Field of Classification Search
CPC .............. G01N 15/1429; G01N 15/10; G01N 15/1459; G01N 15/0205; G01N 21/53; G01N 21/64; G01N 2015/03; G01N 2015/1493; G01N 2015/1006; G01N 2015/0065; G01N 2015/0076; G01N 2015/008; G01N 2015/0073;
(Continued)

(56) References Cited

U.S. PATENT DOCUMENTS

| 4,330,745 A | 5/1982 | Hayashi | |
| 5,159,642 A * | 10/1992 | Kosaka | ................. H04N 7/188 382/134 |

(Continued)

FOREIGN PATENT DOCUMENTS

| CN | 101464245 A | 6/2009 |
| CN | 104075981 A | 10/2014 |

(Continued)

*Primary Examiner* — Sang H Nguyen
(74) *Attorney, Agent, or Firm* — Kory D. Christensen

(57) ABSTRACT

A blood cell parameter correction method includes: obtaining the optical signal information of the particles in the blood sample; according to the pulse width information in the optical signal information, dividing the particles in the blood sample to obtain particle distribution information; according to the preset correction rule, correcting the particle distribution information to obtain the corrected particle distribution information; wherein, the correction rule is related to the pulse width information in the optical signal information, and provided is also a blood sample analyzer executing the method, and storage medium storing the program executing the method.

20 Claims, 8 Drawing Sheets

(58) Field of Classification Search
CPC ... G01N 2015/0084; G01N 2015/1486; G01N 2015/1402
See application file for complete search history.

(56) References Cited

U.S. PATENT DOCUMENTS

| | | | | |
|---|---|---|---|---|
| 5,891,734 | A * | 4/1999 | Gill | G01N 35/109 436/805 |
| 6,979,570 | B2 * | 12/2005 | Narisada | G01N 15/1459 702/29 |
| 2003/0082662 | A1 * | 5/2003 | Nakashima | G01N 15/1459 435/13 |
| 2007/0020721 | A1 | 1/2007 | Yoshida et al. | |
| 2008/0176274 | A1 * | 7/2008 | Tsuji | G01N 33/52 435/34 |
| 2008/0180653 | A1 * | 7/2008 | Narisada | G01N 15/12 356/36 |
| 2009/0006003 | A1 * | 1/2009 | Hirayama | G01N 35/00584 702/21 |
| 2012/0231473 | A1 | 9/2012 | Han | |
| 2013/0345989 | A1 | 12/2013 | Miyamura | |
| 2014/0154677 | A1 * | 6/2014 | Ishisaka | G01N 21/6486 435/6.1 |
| 2014/0273076 | A1 * | 9/2014 | Adams | G01N 15/1434 435/39 |
| 2015/0185201 | A1 * | 7/2015 | Tsuchiya | C12Q 1/02 435/2 |
| 2017/0350804 | A1 * | 12/2017 | Ye | G01N 15/14 |

FOREIGN PATENT DOCUMENTS

| | | |
|---|---|---|
| CN | 104297135 A | 1/2015 |
| CN | 104297213 A | 1/2015 |
| CN | 104515723 A | 4/2015 |
| CN | 104515725 A | 4/2015 |
| CN | 104515728 A | 4/2015 |
| CN | 105388305 A | 3/2016 |
| CN | 105986003 A | 10/2016 |
| CN | 106662572 A | 5/2017 |
| CN | 106687810 A | 5/2017 |
| CN | 109030432 A | 12/2018 |

* cited by examiner

METHOD FOR CORRECTING A BLOOD CELL PARAMETER, BLOOD SAMPLE ANALYZER AND STORAGE MEDIUM

CROSS-REFERENCE TO RELATED APPLICATIONS

This application is a continuation of International Application No. PCT/CN2018/125095, filed Dec. 28, 2018, the content of which is incorporated herein by reference.

TECHNICAL FIELD

The disclosure relates to the technical field of medical testing and, in particular, to a method for correcting a blood cell parameter, a blood sample analyzer, and a storage medium.

BACKGROUND

At present, in the field of medical testing, a routine blood test has become a standard medical means for diagnosis of diseases, and the routine blood test is usually implemented by a medical particle analyzer, such as a blood cell analyzer. During the routine blood test, the blood cell analyzer may be used to classify and count the number of cells, such as white blood cells (WBC), red blood cells, platelets, nucleated red blood cells, and reticulocytes.

However, in conventional solutions for counting different types of cells, during the collection and preparation of blood samples, phenomena such as particle aggregation or particle overlapping may occur. For example, such phenomena may occur in both red blood cell particles and white blood cell particles. For example, in the case of counting white blood cells, during the collection and preparation of blood samples, WBC particle aggregation and WBC particle overlapping may occur, causing the counted number of WBCs to be relatively low, which affects the judgment of clinicians. Under normal conditions, the distribution of WBC particles in the blood is uniform. However, during the collection or preparation of blood samples, WBCs may aggregate together. For example, the document, "Analysis of 50 Cases of White Blood Cell Aggregation Causing False Decrease of White Blood Cells during Routine Blood Test" (Jian Yang, Huishui County People's Hospital, Guizhou Province, Jilin Medical Journal, July 2014, Vol. 35, No. 20) contains the following description: "EDTA anticoagulation can cause the aggregation of white blood cells or the aggregation of white blood cells and platelets, and infectious mononucleosis and acute bacterial infections weaken the repulsive force between white blood cells, etc., which both can cause the aggregation of white blood cells, resulting in false decrease of white blood cells. The aggregation of white blood cells usually causes false decrease of white blood cells, affecting the accuracy of diagnosis. It is necessary to raise awareness to avoid relying solely on detection results of a cytometer and try to avoid being misled by the decrease of white blood cells due to various causes." The overlapping of WBC particles means a situation where a plurality of WBC particles pass through a detection aperture in continuous succession. Based on a pulse width signal generated by the plurality of WBC particles, a detection device identifies the plurality of WBC particles as one large WBC particle.

The phenomena of particle aggregation and particle overlapping may cause an inaccurate cell particle count. For example, the phenomena of WBC particle aggregation and WBC particle overlapping may cause an inaccurate WBC particle count and then affect the judgment of clinicians.

SUMMARY

In view of this, an object of embodiments of the disclosure is to provide a method for correcting a blood cell parameter, a blood sample analyzer, and a storage medium, which solves the problem that the blood cell count is inaccurate in the case of counting the blood cells in the related art.

In order to achieve the above object, technical solutions of the embodiments of the disclosure are implemented as follows.

A method for correcting a blood cell parameter may include:
acquiring optical signal information of particles in a blood sample;
dividing the particles in the blood sample according to pulse width information in the optical signal information, to obtain particle distribution information; and
correcting the particle distribution information according to a preset correction rule, to obtain corrected particle distribution information, wherein the correction rule is related to the pulse width information in the optical signal information.

Optionally, the optical signal information comprises forward-scattered light information.

Optionally, the optical signal information comprises side-scattered light information and/or fluorescence signal information.

Optionally, the correction rule comprises:
setting at least two pulse width ranges; and
correspondingly correcting the particle distribution information according to each pulse width range.

Optionally, the correction rule comprises:
setting at least two pulse width ranges, wherein each pulse width range corresponds to a corresponding correction coefficient, and the correction coefficient is positively correlated with the pulse width information; and
using each correction coefficient to correct the number of particles in each corresponding pulse width range.

Optionally, the correction rule comprises:
correspondingly correcting the particle distribution information according to a preset function, wherein the preset function is an increasing function using the pulse width information as a variable.

Optionally, the correction rule comprises:
determining a correction coefficient according to the preset function; and
correspondingly correcting the particle distribution information according to the correction coefficient, wherein the correction coefficient is positively correlated with the pulse width information.

Optionally, the optical signal information comprises fluorescence signal information, and said correcting the particle distribution information according to a preset correction rule comprises:
filtering out each particle having a fluorescence signal value less than a preset threshold, to obtain filtered particle distribution information; and
correcting, according to the preset correction rule, the filtered particle distribution information.

Optionally, said correcting the particle distribution information according to a preset correction rule comprises:

subtracting a number of particles according to a preset subtraction rule, to obtain particle distribution information after the subtraction of the number of particles; and correcting, according to the preset correction rule, the particle distribution information obtained after the subtraction of the number of particles.

Optionally, the preset subtraction rule comprises:

determining the number of particles to be subtracted according to a blood sample volume and the pulse width information, to obtain the particle distribution information after the subtraction of the number of particles; or in the case of a predetermined blood sample volume, determining the number of particles to be subtracted according to the pulse width information, to obtain the particle distribution information after the subtraction of the number of particles.

Optionally, the number of particles to be subtracted is negatively correlated with the pulse width information.

Optionally, the method further comprises:

outputting the particle distribution information after the correction.

Optionally, the method further comprises:

outputting the particle distribution information before the correction and the particle distribution information after the correction.

Optionally, after correcting the particle distribution information according to the preset correction rule, the method further comprises:

providing a prompt that the particle distribution information has been corrected; and/or providing a prompt and/or an alert for particle aggregation according to a correction amount.

Optionally, the method further comprises:

determining and/or outputting the number of the particles according to the particle distribution information after the correction.

Optionally, after the optical signal information of the particles in the blood sample is acquired, the method further comprises:

identifying and removing ghost particles based on the acquired optical signal information of the particles, and then obtaining WBC particles.

A blood sample analyzer comprises:

at least one reaction cell configured to provide a reaction place for a blood sample and a reagent;

an optical detection apparatus configured to perform light irradiation on the blood sample treated with the reagent, collect optical signals generated by particles in the blood sample treated with the reagent under the light irradiation, and convert the optical signals into electrical signals, so as to output optical signal information;

a transfer apparatus configured to transfer the blood sample treated with the reagent in the reaction cell to the optical detection apparatus; and a processor configured to receive and process the optical signal information output by the optical detection apparatus, to obtain a measurement parameter of the blood sample, wherein the processor is further configured to acquire the optical signal information of the particles in the blood sample; divide the particles in the blood sample according to pulse width information in the optical signal information, to obtain particle distribution information; and correct the particle distribution information according to a preset correction rule, to obtain corrected particle distribution information, wherein the correction rule is related to the pulse width information in the optical signal.

Optionally, the optical signal information comprises forward-scattered light information.

Optionally, the optical signal information comprises side-scattered light information and/or fluorescence signal information.

Optionally, the correction rule stored in the processor comprises:

setting at least two pulse width ranges; and correspondingly correcting the particle distribution information according to each pulse width range.

Optionally, the processor is configured to:

set at least two pulse width ranges, wherein each pulse width range corresponds to a corresponding correction coefficient, and the correction coefficient is positively correlated with the pulse width information; and use each correction coefficient to correct the number of particles in each corresponding pulse width range.

Optionally, the correction rule stored in the processor comprises:

performing corresponding correction on the particle distribution information according to a preset function, wherein the preset function is an increasing function using the pulse width information as a variable.

Optionally, the correction rule stored in the processor comprises:

determining a correction coefficient according to a preset function; and correspondingly correcting the particle distribution information according to the correction coefficient, wherein the correction coefficient is positively correlated with the pulse width information.

Optionally, the processor is configured to:

filter out each particle having a fluorescence signal value less than a preset threshold, to obtain filtered particle distribution information; and correct, according to the preset correction rule, the filtered particle distribution information.

Optionally, the processor is configured to:

subtract a number of particles according to a preset subtraction rule, to obtain particle distribution information after the subtraction of the number of particles; and correct, according to the preset correction rule, the particle distribution information after the subtraction of the number of particles.

Optionally, the preset subtraction rule stored in the processor comprises:

determining the number of particles to be subtracted according to a blood sample volume and the pulse width information, to obtain the particle distribution information after the subtraction of the number of particles; or in the case of a predetermined blood sample volume, determining the number of particles to be subtracted according to the pulse width information, to obtain the particle distribution information after the subtraction of the number of particles.

Optionally, the number of particles to be subtracted is negatively correlated with the pulse width information.

Optionally, the processor is further configured to:

output the particle distribution information after the correction.

Optionally, the processor is further configured to:

output the particle distribution information before and after the correction.

Optionally, after the particle distribution information is corrected according to the preset correction rule, the processor is further configured to:

provide a prompt that the particle distribution information has been corrected; and/or provide a prompt and/or an alert for particle aggregation according to a correction amount.

Optionally, the processor is further configured to:

determine and/or output the number of the particles according to the particle distribution information after the correction.

Optionally, the processor is configured to: identify and remove ghost particles based on the acquired optical signal information of the particles, and then obtain WBC particles.

A computer-readable storage medium may store a program for correcting a blood cell parameter, and when the program for correcting a blood cell parameter is executed by a processor, the steps of any of the above methods for correcting a blood cell parameter are implemented.

According to the method for correcting a blood cell parameter, the blood sample analyzer, and the computer-readable storage medium provided in the embodiments of the disclosure, optical signal information of particles in the blood sample is acquired, the particles in the blood sample are divided according to the pulse width information in the optical signal information, to obtain particle distribution information, and finally the particle distribution information is corrected according to a preset correction rule, to obtain the particle distribution information after the correction. In this way, the particle distribution information is corrected in the blood sample according to the preset correction rule, which solves the problem that the count of blood cells is inaccurate when counting the blood cells in the related art, improves the accuracy of counting blood cells, simplifies the operation process of counting blood cells, and improves the intelligence level of a blood cell count device.

DETAILED DESCRIPTION

The disclosure will be further described below in detail in conjunction with the accompanying drawings and the embodiments. It should be appreciated that the embodiments provided herein are merely intended to explain the disclosure and are not intended to limit the disclosure. In addition, the embodiments provided below are used to implement some embodiments of the disclosure, but not all embodiments for implementing the disclosure. In the case of no conflict, the technical solutions recorded in the embodiments of the disclosure may be implemented in any combination.

It should be noted that, in the embodiments of the disclosure, the terms "comprise", "include" or any other variation thereof are intended to cover non-exclusive inclusion, so that a method or apparatus comprising a series of elements comprises not only explicitly recorded elements, but also other elements not explicitly listed, or elements inherent in implementing the method or apparatus. In the absence of more restrictions, the element defined by the phrase "comprising a/an . . . " does not exclude the presence of a further related element (for example, steps in the method or units in the apparatus, wherein the unit may be a partial circuit, a partial processor, a partial program, software, or the like) in the method or apparatus that comprises the element.

It should be noted that the term "first/second/third" in the embodiments of the disclosure is only used to distinguish similar objects and does not represent specific order for the objects. It may be understood that "first/second/third" may be interchanged for specific order or chronological order when allowed. It should be appreciated that the objects distinguished by "first/second/third" may be interchangeable where appropriate, so that the embodiments of the disclosure described herein can be implemented in an order other than that illustrated or described herein.

Figure 1:
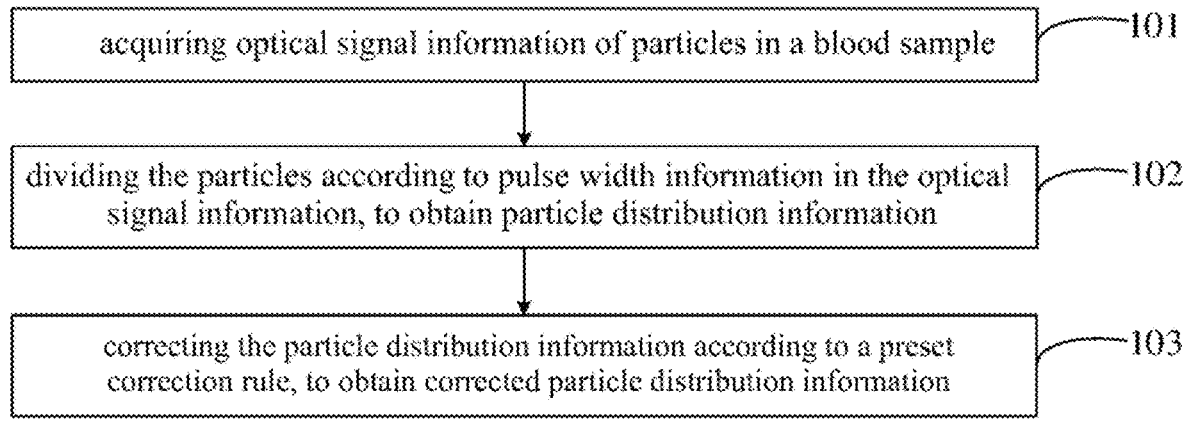
FIG. 1 is a schematic flowchart of a method for correcting a blood cell parameter according to an embodiment of the disclosure.

An embodiment of the disclosure provides a method for correcting a blood cell parameter. As shown in FIG. 1, the method comprises the following steps:

Step 101, acquiring optical signal information of particles in a blood sample.

The optical signal information may comprise forward-scattered light information, and/or side-scattered light information, and/or fluorescence signal information. In other words, the optical signal information may comprise only one of the forward-scattered light information, the side-scattered light information, and the fluorescence signal information, or any combination thereof.

In the embodiment of the disclosure, step 101 of "acquiring optical signal information of particles in a blood sample" may be implemented by a blood sample analyzer. The particles in the blood sample may be all types of cell particles in the blood sample, for example, may comprise white blood cells (WBCs), red blood cells, platelets, nucleated red blood cells, reticulocytes, and other cell particles in the blood sample. The optical signal information may comprise characteristic information of optical signals for distinguishing and identifying the particles in the blood sample. For example, after the particles in the blood sample are processed with the optical signals, pulse widths of the optical signals or pulse peak values of the optical signals corresponding to the particles in the blood sample are detected.

The blood sample is collected and is treated by a chemical reagent; then the blood sample treated with the chemical reagent is processed by using a laser scattering method. The optical signals may include forward-scattered (FSC) light signals, side-scattered (SSC) light signals, and fluorescence (FL) light signals. The FSC can be used to detect a size of a particle, the SSC can be used to detect complexity of an internal structure of a particle, and the FL can be used to detect content of a substance such as deoxyribonucleic acid (DNA) and ribonucleic acid (RNA) that can be stained by a fluorescent dye, in a particle. In this way, after the particles in the blood sample are processed by using the laser, optical signal information such as pulse width information of corresponding optical signals that generated by the particles in the blood sample can be detected.

In the blood, different types of particles differ in size, in internal structure, and in content of a substance that can be stained by a fluorescent dye. Therefore, different types of particles can be distinguished by using the optical signal information reflecting the particles, for example, red blood cells, white blood cells, platelets, and the like can be distinguished from the particles. For the white blood cells, the white blood cells can further be subdivided into five types of cells: neutrophil granulocytes, lymphocytes, eosinophil granulocytes, basophil granulocytes, and monocytes. Therefore, different types of particles can be distinguished by using optical signal information.

Since optical signals corresponding to particles of different sizes in the blood sample have different pulse width information, the particles of different sizes in the blood sample can be distinguished and the number of the particles of different sizes in the blood sample can be counted, according to the pulse width information in the optical signal information. Therefore, for a type of cell, pulse width information of optical signals can be used to distinguish cells of different sizes, so as to facilitate counting of the number of cells, for example, the number of WBC cells.

Step 102, dividing the particles according to pulse width information in the optical signal information, to obtain particle distribution information.

In the embodiment of the disclosure, step 102 of "dividing the particles according to pulse width information in the optical signal information, to obtain particle distribution information" can be implemented by the blood sample analyzer. The blood sample analyzer divides the particles in the blood sample according to the pulse width information in the acquired optical signal information, determines the particles in the blood sample, and obtains the distribution information of the particles in the blood sample. For example, after a type of particles is identified, particles of this type are divided according to the pulse width information, to obtain particle distribution information of the particles of this type, such as pulse width-based distribution information of WBC particles, pulse width-based distribution information of red blood cell particles, pulse width-based distribution information of platelet particles, pulse width-based distribution information of nucleated red blood cell particles, and pulse width-based distribution information of reticulocyte particles. In the following description, the pulse width-based distribution information of WBC particles is taken as an example for description.

In one embodiment, if the distribution information of the WBC particles is to be corrected, after step 101, ghost particles can be identified and removed from the obtained optical signal information of the particles, and then the WBC particles are obtained. Then, the WBC particles are divided according to the pulse width information in the optical signal information, to obtain WBC particle distribution information. The ghost particles may be identified according to FSC/SSC/FL three-dimensional signals in the obtained particle optical signal information, or the ghost particles may be identified according to pulse width information in the acquired particle optical signal information, which is not specifically limited herein.

Step 103, correcting the particle distribution information according to a preset correction rule, to obtain particle distribution information after the correction.

The correction rule is related to the pulse width information in the optical signal information.

In the embodiment of the disclosure, step 103 of "correcting the particle distribution information according to a preset correction rule, to obtain particle distribution information after the correction" can be implemented by the blood sample analyzer. The preset correction rule is determined according to characteristics of particle overlapping and/or particle aggregation. Therefore, the preset correction rule is used to correct the particle distribution information, thereby correcting the number of particles, and solving the problem that the number of particles is lowered due to particle overlapping and/or particle aggregation, so that the final corrected number of particles in the blood sample is more consistent with the actual number.

According to the method for correcting a blood cell parameter provided in the embodiment of the disclosure, optical signal information of particles in a blood sample is acquired, the particles in the blood sample are divided according to pulse width information in the optical signal information, to obtain particle distribution information, and finally the particle distribution information is corrected according to a preset correction rule, to obtain particle distribution information after the correction. In this way, the particle distribution information in the blood sample is corrected according to the preset correction rule, which solves the problem that the count of blood cells is inaccurate when counting the blood cells (for example, white blood cells) in the related art, improves the accuracy of counting blood cells, simplifies the operation process of counting blood cells, and improves the intelligence level of a blood cell count device.

Based on the foregoing embodiments, in other embodiments of the disclosure, after performing step 103, the blood sample analyzer may further choose to perform step A or step B or step C or step D:

At step A, the particle distribution information after the correction is output.

In the embodiment of the disclosure, after correcting the particle distribution information of the blood sample according to the preset correction rule to obtain the particle distribution information after the correction, the blood sample analyzer may output and display the particle distribution information after the correction via a display of the blood sample analyzer. The particle distribution information after the correction may be displayed on the display of the blood sample analyzer in the form of a scattergram, a data array, a combination of a scattergram and a data array, etc.

At step B, the particle distribution information before the correction and the particle distribution information after the correction are output.

In the embodiment of the disclosure, after performing correcting the particle distribution information of the blood sample according to the preset correction rule to obtain the particle distribution information after the correction, the blood sample analyzer may display the particle distribution information before the correction, namely the particle distribution information obtained in step 102, and the particle distribution information after the correction, namely, the corrected particle distribution information obtained in step 103, on the display of the blood sample analyzer. The particle distribution information before the correction and the particle distribution information after the correction may be displayed on the display of the blood sample analyzer in the form of a scattergram, a data array, a combination of a scattergram and a data array, etc.

At step C, a prompt that the particle distribution information has been corrected is provided; and/or a prompt and/or an alert of particle aggregation according to a correction amount are/is provided.

In the embodiment of the disclosure, after correcting the particle distribution information of the blood sample according to the preset correction rule to obtain the particle distribution information after the correction, the blood sample analyzer may generate prompt information notifying a user who uses the blood sample analyzer that the particle distribution information of the blood sample has been corrected, such as "WBC particle information has been corrected". The prompt information may be directly displayed on the display of the blood sample analyzer, or the blood sample analyzer may send the prompt information to a mobile terminal device that is communicatively connected to the blood sample analyzer. Alternatively, a prompt and/or an alert of particle aggregation may be provided according to the correction amount, or a prompt and/or an alert of a particle aggregation degree may be provided according to the correction amount. For example, prompt information such as "Particle aggregation", "The particle aggregation degree is too high" may be provided, or a visual alert may be provided on the display. The particle aggregation degree may be determined according to the correction amount. The larger the correction amount, the higher the aggregation degree. The correction amount may be determined according to a relationship between the number of particles before the correction and the number of particles after the correction, for example, according to a proportional relationship or difference relationship between the two.

At step D, the number of the particles is determined and/or output according to the particle distribution information after the correction.

In the embodiment of the disclosure, after correcting the particle distribution information of the blood sample according to the preset correction rule to obtain the particle distribution information after the correction, the blood sample analyzer counts the number of the particles according to the particle distribution information after the correction, to obtain the actual number of the particles in the blood sample, namely, the number of the particles. Alternatively, after the number of the particles in the blood sample is obtained, the number of the particles may be displayed on the display of the blood sample analyzer.

Figure 2:
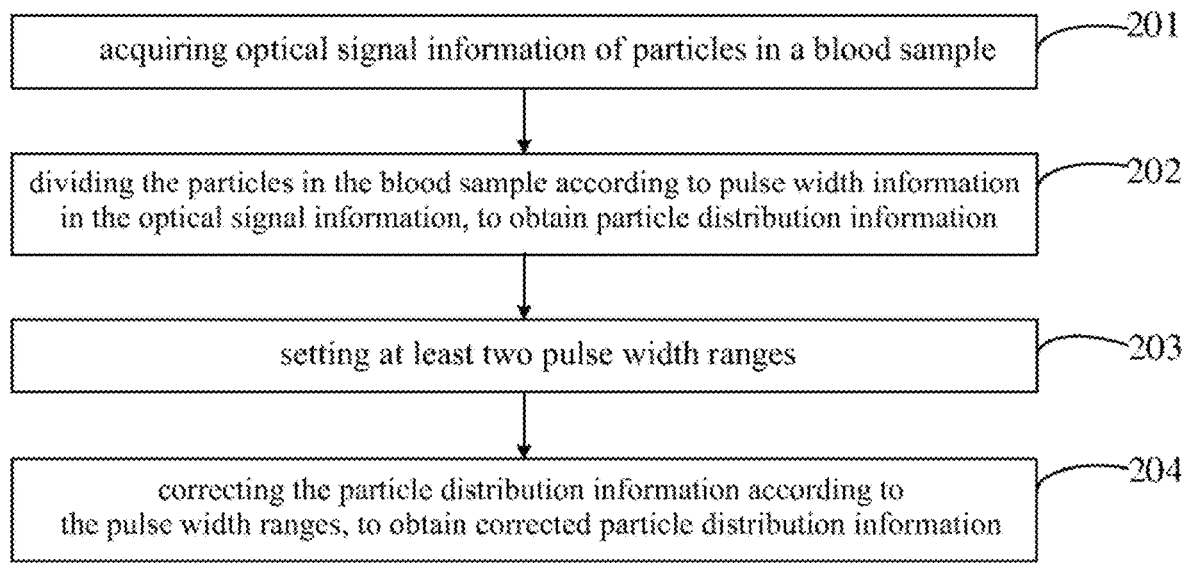
FIG. 2 is a schematic flowchart of another method for correcting a blood cell parameter according to an embodiment of the disclosure.

Based on the foregoing embodiments, an embodiment of the disclosure provides a method for correcting a blood cell parameter that is applied to a blood sample analyzer. As shown in FIG. 2, the method comprises the following steps.

At step 201, optical signal information of particles in a blood sample is acquired.

The optical signal information may comprise forward-scattered light information, and/or side-scattered light information, and/or fluorescence signal information. In other words, the optical signal information may comprise only one of the forward-scattered light information, the side-scattered light information, and the fluorescence signal information, or any combination thereof.

In the embodiment of the disclosure, the optical signal information comprising FSC information is taken as an example for description.

Figure 3:
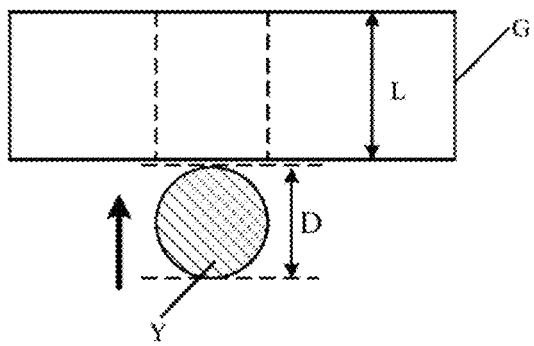
FIG. 3 is a schematic structural diagram of an optical flow cell according to an embodiment of the disclosure.
Figure 4:
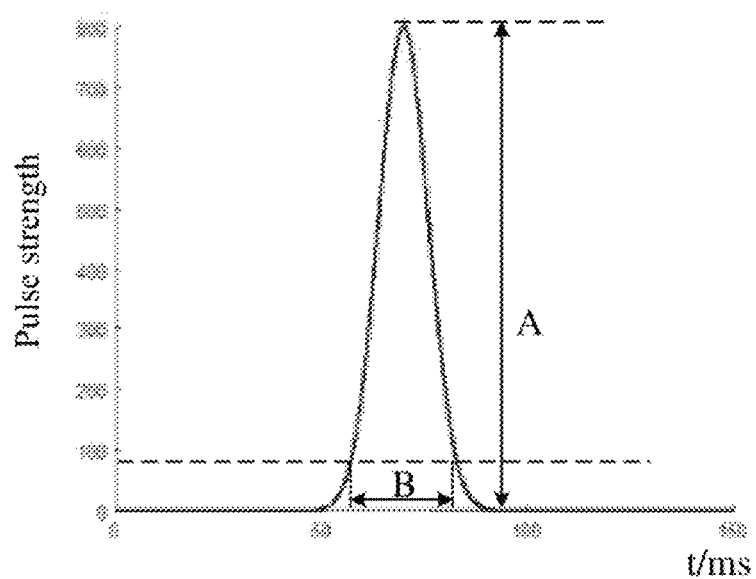
FIG. 4 is a schematic diagram of a pulse width according to an embodiment of the disclosure.

Different particles in the blood sample can usually be determined based on sizes of particles or the like in the blood sample. The size of a particle in the blood sample may be represented by a time t for the particle to pass through a detection aperture of an optical flow cell in the blood sample analyzer. As shown in FIG. 3, a length of the optical flow cell G is L. It is assumed that a flow velocity of a particle Y in the blood sample in the optical flow cell is u. A direction indicated by an arrow in FIG. 3 represents a flow direction of the particle Y in the blood sample. Then the time t for the particle to pass through the optical flow cell can be calculated through the following formula: $t=(L+D)/u$, where D represents a diameter of the cell particle. Therefore, the blood sample analyzer can measure the size of a particle in the blood sample by recording the time for the particle in the blood sample to pass through the optical flow cell, which is specifically described as follows: When a particle in the blood sample passes through the detection aperture of the optical flow cell, the blood sample analyzer is excited to send a pulse signal until the particle in the blood sample completely passes through the optical flow cell, and a pulse signal obtained may be shown in FIG. 4, in which the abscissa is the time t for the particle to pass through the optical flow cell, which is measured in milliseconds (ms), the ordinate is pulse strength; A is a pulse peak value, i.e., a pulse strength value from a baseline to a pulse maximum, and B is a pulse width (PW for short) that can be used to represent an actual time for the particle in the blood sample to pass through the detection aperture of the optical flow cell. As shown in FIG. 4, the pulse width may be a time width between two intersection points of a pulse strength curve and a straight line represented by a preset pulse strength threshold. In FIG. 4, the pulse peak value A is about 800, and the corresponding pulse width B is about 25 ms. Based on the foregoing calculation formula for the time t for the particle to pass through the optical flow cell, it can be learned that when the flow velocity of the blood sample in the optical flow cell is determined, the larger the particle flowing through the detection aperture of the optical flow cell is, the longer the time for the particle to pass through the detection aperture of the optical flow cell is, and the larger the corresponding pulse width is. When some particles such as WBCs in the blood sample aggregate together, because two or more WBCs aggregate together and pass through the detection aperture of the optical flow cell together, the detected particle diameter in the blood sample would be larger than that of a normal WBC particle, resulting in a longer time to pass through the detection aperture of the optical flow cell, and a larger corresponding pulse width.

Figure 5:
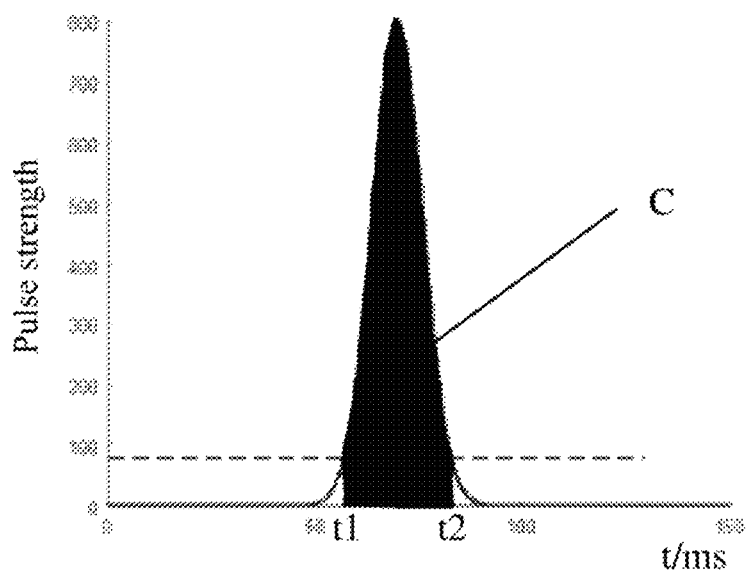
FIG. 5 is a schematic diagram of a pulse area according to an embodiment of the disclosure.

In the embodiments of the disclosure, the pulse width information of the particles in the blood sample may be forward-scattered light pulse width (FSCW), or side-scattered light pulse width (SSCW), or fluorescence light pulse width (FLW). It should be noted that, as an alternative of the pulse width, a pulse area, which may be a pulse area of any of FSC, SSC and FL, may also be used. The pulse area may be specifically shown by C in FIG. 5, and is an area enclosed by the pulse strength curve between the abscissa t1 corresponding to the first intersection point of the pulse strength curve and the pulse strength threshold and the abscissa t2 corresponding to the last intersection point of the pulse strength curve and the pulse strength threshold.

At step 202, the particles in the blood sample are divided according to pulse width information in the optical signal information, to obtain particle distribution information.

Figure 6:
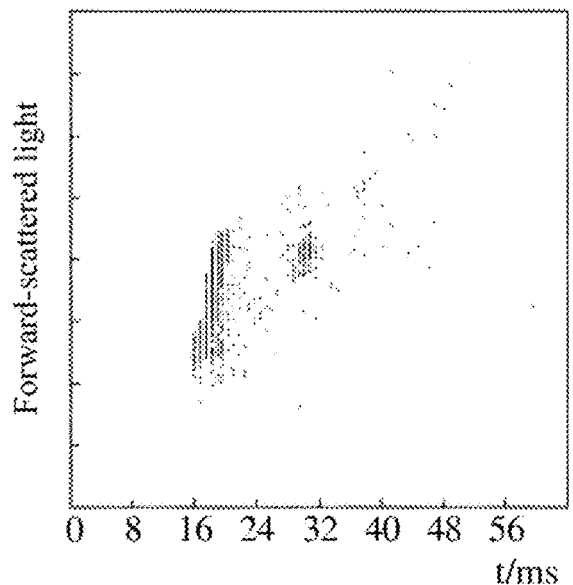
FIG. 6 is a schematic diagram of an application scenario according to an embodiment of the disclosure.

Specifically, since different particles in the blood sample have different pulse width information, the particles in the blood sample can be divided according to pulse width information in different optical signal information, to obtain particle distribution information corresponding to each particle type. For example, WBC particle distribution information obtained is shown in FIG. 6, wherein the abscissa in FIG. 6 represents a pulse width, the ordinate represents a pulse peak value of forward-scattered light, and each black dot in the figure represents one WBC particle.

At step 203, at least two preset pulse width ranges are acquired.

In the embodiment of the disclosure, the at least two preset pulse width ranges may be empirical and theoretical values obtained through a large number of experimental analyses, which may be constantly corrected in a practical application process.

At step 204, the particle distribution information is correspondingly corrected according to the pulse width ranges, to obtain particle distribution information after the correction.

The correction rule is related to the pulse width information in the optical signal information.

In the embodiment of the disclosure, the obtained particle distribution information is divided according to the at least two set pulse width ranges, the particles are divided into particles in at least two regions, and the particles in different regions are counted. Then, the number of particles in corresponding regions is corrected according to correction coefficients corresponding to the at least two set pulse width ranges, so that the particle distribution information after the correction can be obtained.

Exemplarily, there may be two preset pulse width ranges in the correction rule stored in the blood sample analyzer, i.e., a single-pulse width range and a double-pulse width range. To be specific, the particle distribution information is divided into a single-particle distribution region and a multiple-particle distribution region according to the single-pulse width range and the multiple-pulse width range. In this way, the two particle distribution regions can be corrected by using their respective methods, to obtain the particle distribution information after the correction.

There may be more than two, for example, six preset pulse width ranges in the correction rule stored in the blood sample analyzer, i.e., a single-pulse width range, a double-pulse width range, a triple-pulse width range, a quadruple-pulse width range, a quintuple-pulse width range, and a sextuple-pulse width range. To be specific, the particle distribution information is divided into a single-particle distribution region, a double-particle distribution region, a triple-particle distribution region, a quadruple-particle distribution region, a quintuple-particle distribution region, and a sextuple-particle distribution region according to the six preset pulse width ranges. In this way, the two particle distribution regions can be corrected by using their respective methods, to obtain the particle distribution information after the correction.

Figure 7:
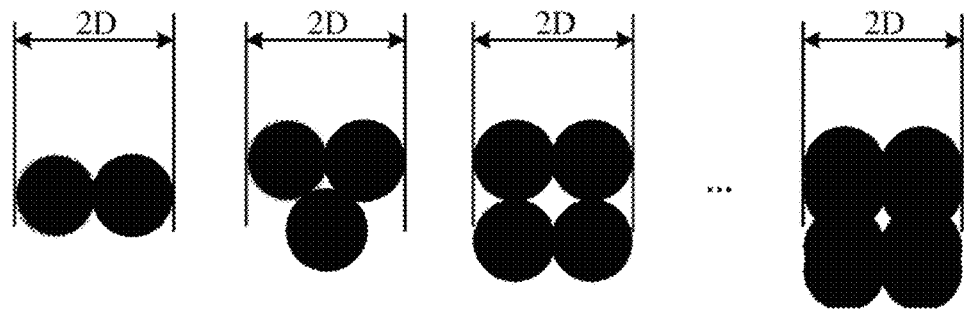
FIG. 7 is a schematic diagram of another application scenario according to an embodiment of the disclosure.

The single-pulse width range is a range of a pulse width measured when a single cell particle passes through the optical flow cell, i.e., a pulse width range corresponding to a particle diameter being the diameter of one particle (single particle diameter). The double-pulse width range is a pulse width range corresponding to a particle diameter being two times of the diameter of one particle, when a plurality of cell particles passes through the optical flow cell. Similarly, the triple-pulse width range is a pulse width range corresponding to three times of the diameter of one particle, the quadruple-pulse width range is a pulse width range corresponding to four times of the diameter of one particle, the quintuple-pulse width range is a pulse width range corresponding to five times of the diameter of one particle, the sextuple-pulse width range is a pulse width range corresponding to six times of the diameter of one particle, and so on. It should be noted that the two times of the diameter of one particle, the three times of the diameter of one particle, the four times the diameter of one particle, the five times of the diameter of one particle, and the six times of the diameter of one particle occur due to cell aggregation. Usually, the two times of the diameter of one particle may occur due to aggregation of two cell particles, aggregation of three cell particles, aggregation of four cell particles, and aggregation of up to eight cell particles. FIG. 7 is a schematic diagram of the two times of the diameter of one particle occurring due to aggregation of two cell particles, aggregation of three cell particles, aggregation of four cell particles, and aggregation of eight cell particles. The above-mentioned single-pulse width range, double-pulse width range, . . . , sextuple-pulse width range, and multiple-pulse width range may all be empirical values.

Figure 8:
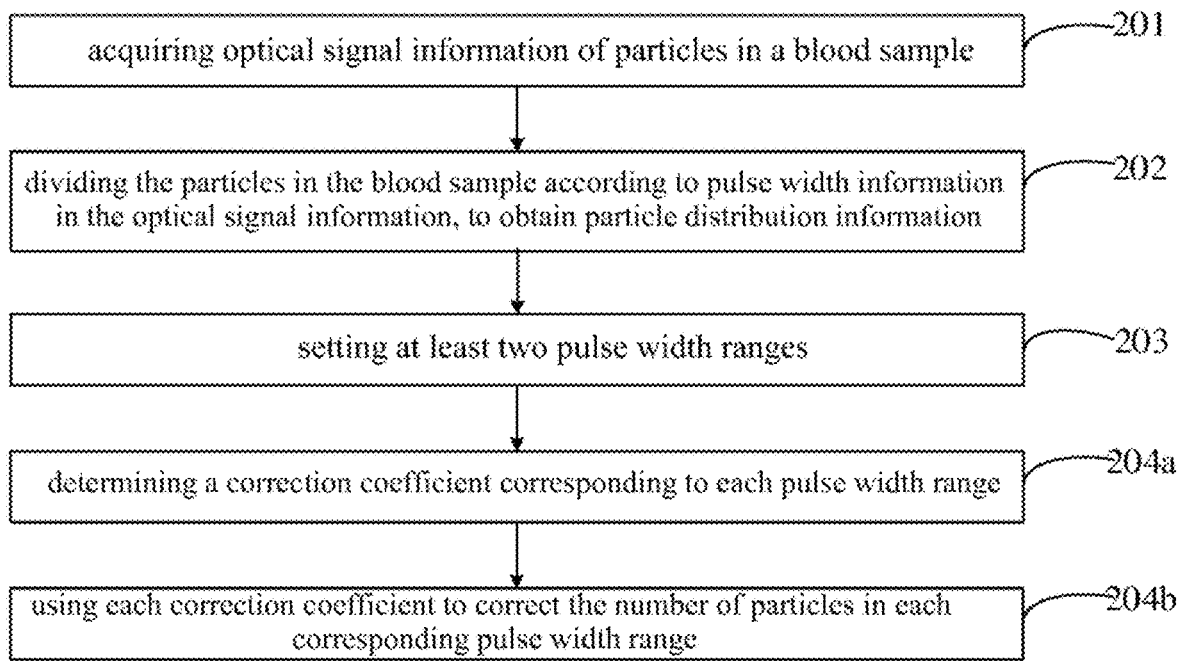
FIG. 8 is a schematic flowchart of still another method for correcting a blood cell parameter according to an embodiment of the disclosure.

Based on the foregoing embodiments, another embodiment of the disclosure provides a method for correcting a blood cell parameter that is applied to a blood sample analyzer. As shown in FIG. 8, when the blood sample analyzer executes a stored correction rule, step 204 performed may be specifically implemented through the following steps 204a and 204b, wherein the correction rule is: setting at least two pulse width ranges, wherein each pulse width range corresponds to a corresponding correction coefficient, and the correction coefficient is positively correlated with the pulse width information; and using each correction coefficient to correct the number of particles in each corresponding pulse width range.

At step 204a, a correction coefficient corresponding to each pulse width range is determined.

The correction coefficient is positively correlated with the pulse width.

In the embodiment of the disclosure, the correction coefficient is positively correlated with the pulse width, that is, the correction coefficient varies with the pulse width. For example, the correction coefficient increases as the pulse width range increases. For example, a first pulse width range is (a, b), and has a correction coefficient, for example, a first correction coefficient; a second pulse width range is (b, c), and has another correction coefficient, for example, a second correction coefficient; and a third pulse width range is (c, d), and has still another correction coefficient, for example, a third correction coefficient, where $a<b<c<d$, and accordingly, the first correction coefficient is less than or equal to the second correction coefficient, and the second correction coefficient is less than or equal to the third correction coefficient.

Each correction coefficient corresponding to each pulse width range is preset and may be an empirical value or an empirical formula.

Figure 9:
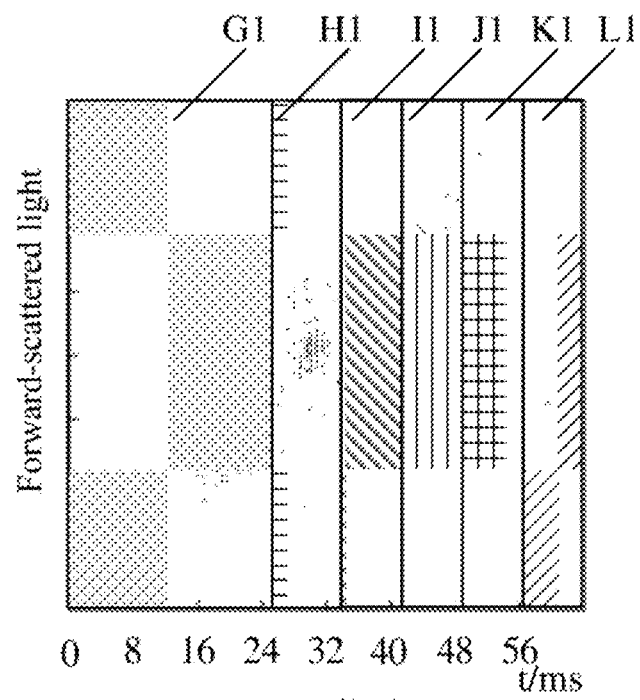
FIG. 9 is a schematic diagram of still another application scenario according to an embodiment of the disclosure.

Exemplarily, two or more pulse width ranges are set based on WBC particle distribution information. For example, when six pulse width ranges are set as shown in FIG. 9, particle distribution information corresponding to each pulse width range is specifically as follows: particle distribution information G1 in a pulse width range of 0 ms to 25 ms is particle distribution information of the single-particle region, particle distribution information H1 in a pulse width range of 25 ms to 33 ms is particle distribution information of the double-particle region, particle distribution information I1 in a pulse width range of 33 ms to 41 ms is particle distribution information of the triple-particle region, particle distribution information J1 in a pulse width range of 41 ms to 49 ms is particle distribution information of the quadruple-particle region, particle distribution information K1 in a pulse width range of 49 ms to 57 ms is particle distribution information of the quintuple-particle region, and particle distribution information L1 in a pulse width range of 57 ms to 65 ms is particle distribution information of the sextuple-particle region. A single-particle refers to a single cell particle with a diameter being the diameter of one cell particle. Due to cell aggregation and cell overlapping, there are a double-particle, a triple-particle, a quadruple-particle, a quintuple-particle, and a sextuple-particle. Corresponding correction coefficients set based on the particle distribution information of the single-particle region, particle distribution information of the double-particle region, particle distribution information of the triple-particle region, particle distribution information of the quadruple-particle region, particle distribution information of the quintuple-particle region, and particle distribution information of the sextuple-particle region of WBCs are empirical values, i.e., constants which are 1, 3, 10, 20, 30, and 40, respectively, and each correction coefficient is positively correlated with the pulse width.

Figure 10:
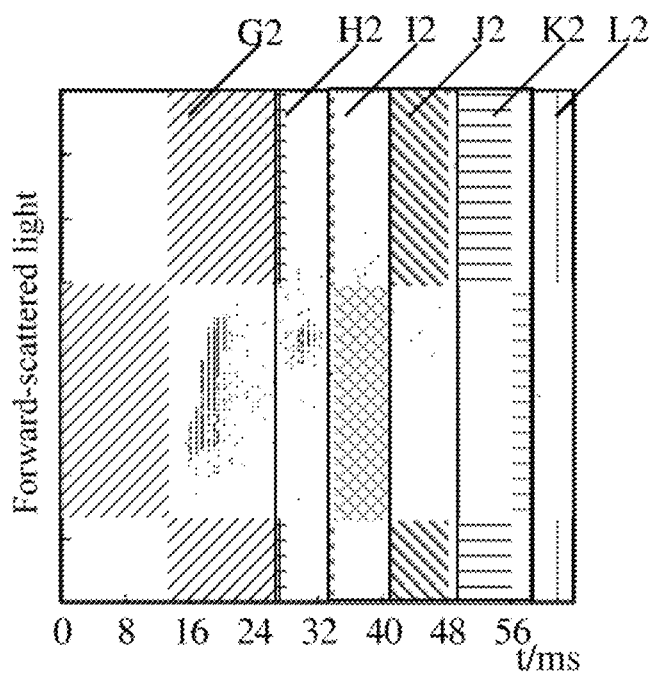
FIG. 10 is a schematic diagram of yet another application scenario according to an embodiment of the disclosure.

It should be noted that in a practical application process, the equal-pulse-width division manner shown in FIG. 9 may be used for pulse width range division; or the non-equal-pulse-width division manner shown in FIG. 10 may also be used for pulse width range division.

At step 204b, each correction coefficient is used to correct the number of particles in each corresponding pulse width range.

In the embodiment of the disclosure, the number of particles in each pulse width range is counted, and then each correction coefficient is multiplied by the number of particles in each corresponding pulse width range, so that the correction of the number of particles in each pulse width range can be implemented.

In an embodiment, a sample was collected, wherein a reference value for WBCs was $6.72 \times 10^9$/L, a count value given by a white blood cell measurement channel was $3.72 \times 10^9$/L after measuring by an instrument BC-6000 manufactured by Shenzhen Mindray Bio-Medical Electronics Co., Ltd., and the value obtained from the white blood cell measurement channel was 45% less than the reference value. After microscopic examination, it was confirmed that WBC aggregation occurred in the sample. FIG. 6 shows an example of a fluorescence and forward-scattered light scattergram of a sample in which WBC aggregation occurs. By counting particles in different pulse width ranges shown in FIG. 10, the following can be obtained: the number of particles corresponding to the particle distribution information of the single-particle region G2 is 2115, the number of particles corresponding to the particle distribution information of the double-particle region H2 is 215, the number of particles corresponding to the particle distribution information of the triple-particle region 12 is 110, the number of particles corresponding to the particle distribution information of the quadruple-particle region J2 is 10, the number of particles corresponding to the particle distribution information of the quintuple-particle region K2 is 5, and the number of particles corresponding to the particle distribution information of the sextuple-particle region L2 is 2. If correction coefficients set for the six pulse width ranges in FIG. 10 are the same as the correction coefficients set for the six pulse width ranges in FIG. 9, the corresponding correction coefficients in step 204a are used to correct the number of particles in different pulse width ranges, and the following is thus obtained: the number of particles obtained after correcting the particle distribution information of the single-particle region G2 is 2115×1=2115, the number of particles obtained after correcting the distribution information of the double-particle region H2 is 215×3=645, the number of particles obtained after correcting the particle distribution information of the triple-particle region 12 is 110×10=1100, the number of particles obtained after correcting the particle distribution information of the quadruple-particle region J2 is 10×20=200, the third number of the first cell samples corresponding to the particle distribution information of the quintuple-particle region K2 is 5×30=150, and the number of particles obtained after correcting the particle distribution information of the sextuple-particle region L2 is 2×40=80. By accumulating the particles in the above regions in different pulse width ranges, it can be determined that the actual number of WBC particles in FIG. 6 is 4290, and a corresponding WBC value is $6.73 \times 10^9$/L that corresponds to the reference value of $6.72 \times 10^9$/L. In this case, it is considered that the correction is basically right.

Figure 11:
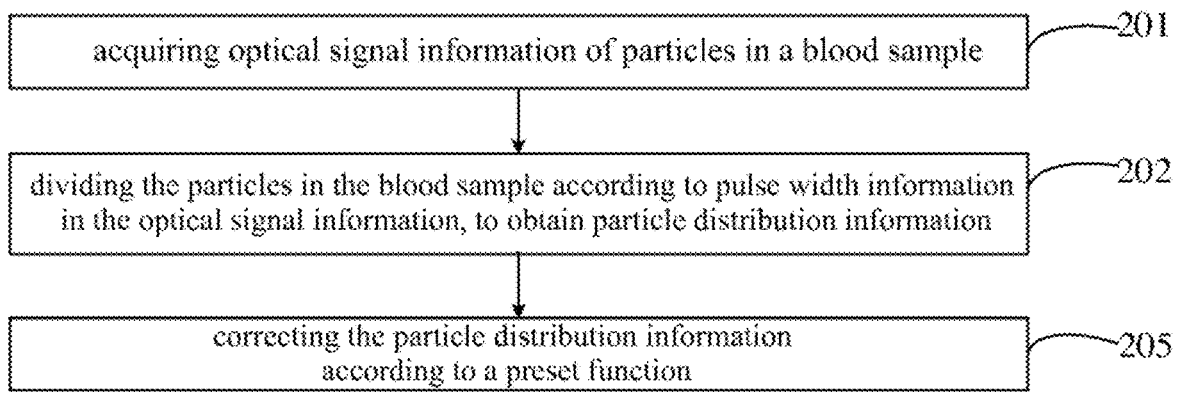
FIG. 11 is a schematic flowchart of yet another method for correcting a blood cell parameter according to an embodiment of the disclosure.

Based on the foregoing embodiments, another embodiment of the disclosure provides a method for correcting a blood cell parameter that is applied to a blood sample analyzer. As shown in FIG. 11, after performing step 202, the blood sample analyzer may further choose to perform step 205.

At step 205, the particle distribution information is corrected according to a preset function.

The preset function is an increasing function using the pulse width information as a variable, and the particle distribution information is correspondingly corrected according to a function calculation result (dependent variable). The preset function may be a function using the pulse width information as a variable and a correction coefficient as a dependent variable, that is, the function calculation result may be a correction coefficient that increases as the pulse width increases. Then, the number of particles corresponding to a corresponding pulse width in the particle distribution information is calculated according to the correction coefficient. For example, the correction coefficient is multiplied by the number of particles corresponding to the pulse width to obtain the corrected number of particles corresponding to the pulse width. Certainly, the preset function may also be a function using the pulse width information and the number of particles corresponding to the corresponding pulse width as variables, and the correction coefficient as a dependent variable.

In one embodiment of the disclosure, the preset function is a preset function related to the pulse width information and is an empirical formula.

Figure 12:
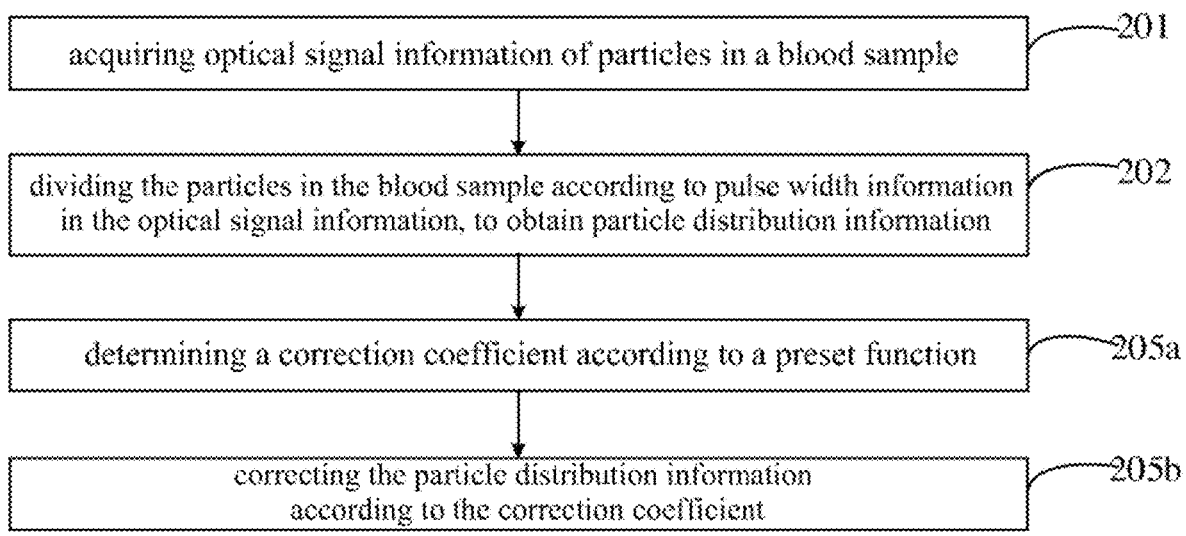
FIG. 12 is a schematic flowchart of a method for correcting a blood cell parameter according to another embodiment of the disclosure.

In other embodiments of the disclosure, as shown in FIG. 12, when the blood sample analyzer performs step 205, the step may be specifically implemented by the following steps 205a and 205b:

At step 205a, a correction coefficient is determined according to a preset function.

In the embodiment of the disclosure, the preset function may be a piecewise function related to the pulse width information.

Exemplarily, when the pulse width information in the WBC particle distribution information is less than or equal to 25 ms, the corresponding preset function is a preset constant, such as 1, and when the corresponding pulse width information is greater than 25 ms, the corresponding preset function is a preset function related to the pulse width information. A calculation process using the preset function corresponding to pulse width information greater than 25 ms comprises steps a and b:

At step a, the product of each pulse width information and a first preset coefficient is calculated, to obtain a first value.

Figure 13:
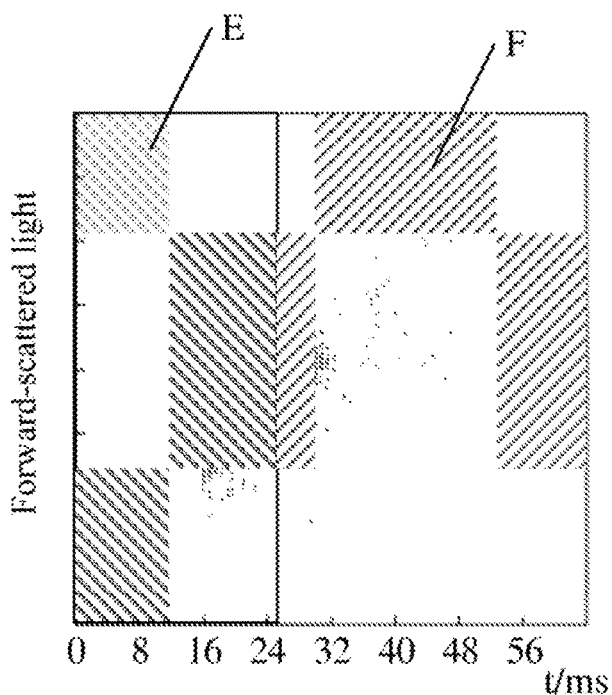
FIG. 13 is a schematic diagram of an application scenario according to another embodiment of the disclosure.

In the embodiment of the disclosure, the first value $x_j = a \times w_j$ is calculated, where a represents the first preset coefficient, and is usually a constant and also an empirical value, and in different application scenarios, may change depending on actual application scenarios, and can also be constantly corrected. In the embodiment of the disclosure, a may be 0.925, and w represents each pulse width information. In other words, based on the preset function, the WBC particle distribution information in FIG. 6 can be divided into particle distribution information shown in FIG. 13. To be specific, the correction coefficient corresponding to the region E (with pulse width information being less than or equal to 25 ms) in FIG. 13 is a constant and is usually set as 1, and $w_j$ may be each pulse width of the particles distributed in the region F in FIG. 13 (with pulse width information being greater than 25 ms), where a value of j is a positive integer, assuming that corresponding pulse widths in the region F in FIG. 13 are counted, there are n pulse widths in total, and then the value of j is 1, 2, . . . , n.

At step b, the sum of the first value and a second preset coefficient is calculated, to obtain a corresponding correction coefficient.

In the embodiment of the disclosure, a correction coefficient of a cell particle sample corresponding to each pulse width information may be denoted as $y_j = x_j + b$, where b is the second preset coefficient, and is an empirical value, and in different application scenarios, may change depending on actual application scenarios, and can also be constantly corrected. Exemplarily, in the embodiment of the disclosure, for the calculation of the correction coefficient of the particles in the region F in FIG. 13, a value of b may be −24.75, and a calculation formula of the correction coefficient of the cell particle sample corresponding to each pulse width information, that is, the preset function with the pulse width information greater than 25 ms may be denoted as $y_j = 0.925\ w_j - 24.75$.

At step 205b, the particle distribution information is correspondingly corrected according to the correction coefficient.

The correction coefficient is positively correlated with the pulse width information.

In the embodiment of the disclosure, the number of WBC particles in the region where the pulse width information is less than or equal to 25 ms is counted, and the number of WBC particles in the region where the pulse width information is less than or equal to 25 ms is multiplied by the correction coefficient set for the region where the pulse width information is less than or equal to 25 ms, to obtain the actual number of WBC particles in the region where the pulse width information is less than or equal to 25 ms, and the number of WBC particles corresponding to each pulse width in the region where the pulse width information is greater than 25 ms is counted, and the correction coefficient corresponding to each pulse width is calculated according to the formula $y_j = 0.925\ w_j - 24.75$, then the product of the correction coefficient corresponding to each pulse width and the number of WBC particles corresponding to each pulse width is calculated to obtain the actual number of WBC particles corresponding to each pulse width, and the cumulative sum of the actual number of WBC particles corresponding to each pulse width is finally calculated, to obtain the number of WBC particles in the region where the pulse width information is greater than 25 ms.

In an embodiment, a sample was collected, wherein a reference value for WBCs was 6.72×10^9/L, a count value given by a white blood cell measurement channel was 3.72×10^9/L after measuring by an instrument BC-6000 manufactured by Shenzhen Mindray Bio-Medical Electronics Co., Ltd., and the value obtained from the white blood cell measurement channel is 45% less than the reference value. After microscopic examination, it was confirmed that WBC aggregation occurred in the sample. FIG. 6 shows an example of a fluorescence and forward-scattered light scattergram of a sample in which WBC aggregation occurs. The number of particles in the single-pulse width range in E of FIG. 13 is counted and corrected to obtain the actual number of particles being 2115, and the above-mentioned preset function formula with the pulse width information greater than 25 ms is used to correct the number (255) of particles in the multiple-pulse width range in F of FIG. 13 to obtain the actual number of particles being 2160. Therefore, the actual total number of particles is 4275, and a corresponding WBC value is 6.71×10^9/L that basically corresponds to the reference value 6.72×10^9/L. In this case, it is considered that the correction is basically right.

Figure 14:
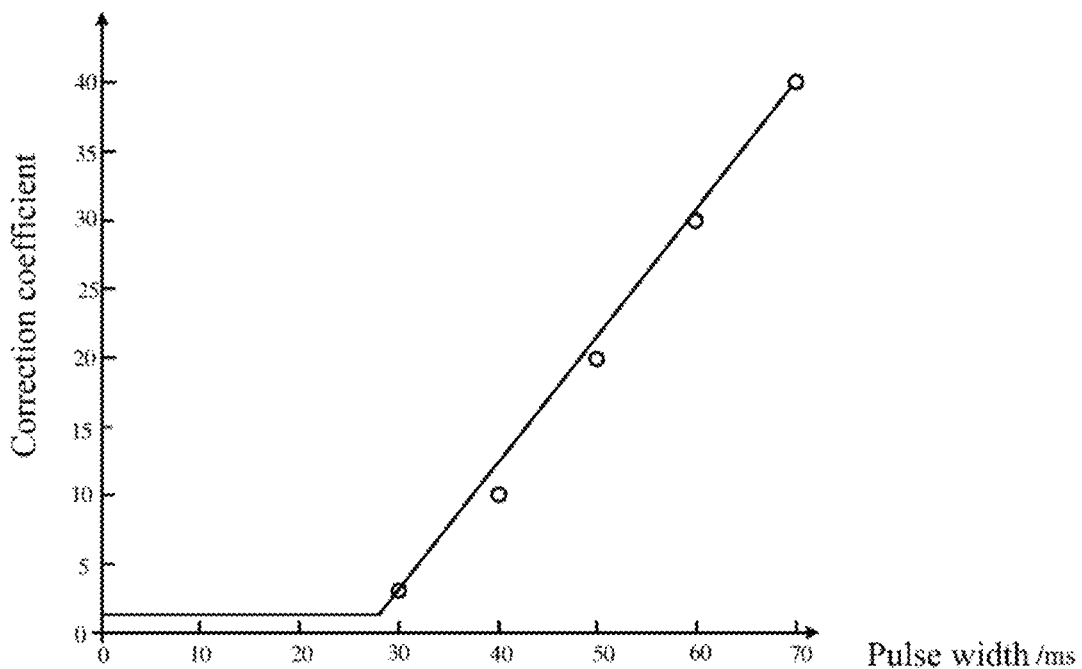
FIG. 14 is a schematic diagram of an application scenario according to another embodiment of the disclosure.

A process of setting the preset function may be: determining an average value of particle aggregation in each pulse width range, wherein a specific formula for determining the average value of particle aggregation may be:

$$\overline{N} = \frac{\sum i \times P}{\sum P},$$

where i is the number of aggregated particles when particles aggregate in each pulse width range. For example, in the case of WBC particle aggregation with two times of the diameter of one particle, if cell aggregations of two WBC particles to eight WBC particles occur with equal probability, it may be calculated, by using the above formula, that an average value of the number of aggregated WBC particles in the double-pulse width range is 5. Therefore, in the case of particle aggregation, when the actual number of aggregated WBC particles in the double-pulse width range is counted, the number of WBC particles counted in the double-pulse width range may be multiplied by a coefficient of 5. Similarly, it can be calculated that an average value of the number of aggregated WBC particles in the triple-pulse width range is 15, an average value of the number of aggregated WBC particles in the quadruple-pulse width range is 25, an average value of the number of aggregated WBC particles in the quintuple-pulse width range is 35, and an average value of the number of aggregated WBC particles in the sextuple- and more times-pulse width range is 45. Because both WBC particle aggregation and WBC particle overlapping phenomena may appear in the same region, which may interfere with WBC particle aggregation, the number of aggregated particles corresponding to the double- and more times-pulse width ranges may be appropriately reduced, and a fitting method may be used to appropriately decrease an average value used as a correction coefficient. The experimental data shows that average pulse widths of the detected numbers of single-particles, double-particles, triple-particles, quadruple-particles, quintuple-particles, and sextuple-particles are about 18, 30, 40, 50, 60, and 70. During fitting, a fitted curve roughly passes through points (x, y) composed of a pulse width and a correction coefficient, where x is a pulse width value and y is a correction coefficient corresponding to each pulse width range. For example, a point for the double-particle region is (30, 5), a point for the triple-particle region is (40, 15), and so on. The fitting may be realized in the form of linear fitting, quadratic curve fitting, or the like. A linear fitting particle compensation curve is shown in FIG. 14. There are five control points in a pulse width range of 27 to 70, which are (30, 3), (40, 10), (50, 20), (60, 30), and (70, 40). In this range, a linear fitting manner is used to generate a function corresponding to a continuous aggregated particle compensation coefficient correction straight line, to correct the aggregated particles.

It should be noted that, for the explanation of the same steps or concepts in this embodiment as in other embodiments, reference may be made to the description in the other embodiments, and details are not repeated herein.

According to the method for correcting a blood cell parameter provided in the embodiments of the disclosure, optical signal information of particles in a blood sample is acquired, the particles in the blood sample are divided according to pulse width information in the optical signal information, to obtain particle distribution information, and finally the particle distribution information is corrected according to a preset correction rule, to obtain particle distribution information after the correction. In this way, the particle distribution information in the blood sample is corrected according to the preset correction rule, which solves the problem that the number of blood cells is inaccurate due to particle aggregation and particle overlapping, etc. when counting blood cells in the related art, improves the accuracy of counting blood cells, simplifies the operation process of counting blood cells, and improves the intelligence level of a blood cell count device.

Figure 15:
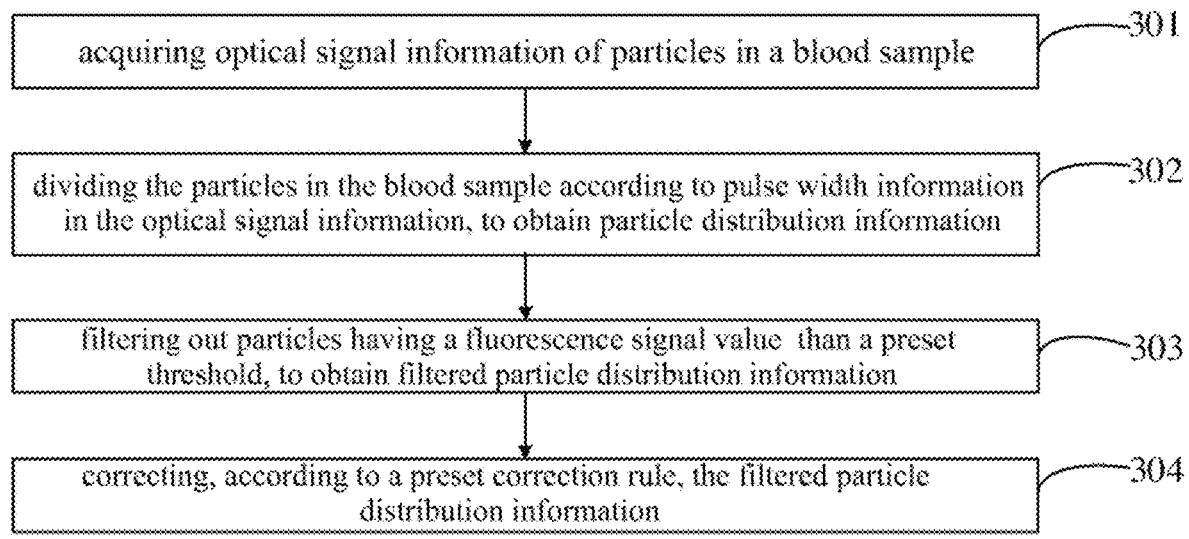
FIG. 15 is a schematic flowchart of another method for correcting a blood cell parameter according to another embodiment of the disclosure.

Based on the foregoing embodiments, an embodiment of the disclosure provides a method for correcting a blood cell parameter that is applied to a blood sample analyzer. As shown in FIG. 15, the method comprises the following steps.

At step 301, optical signal information of particles in a blood sample is acquired.

The optical signal information comprises fluorescence signal information.

In the embodiment of the disclosure, the corresponding optical signal information comprises FL signal information and FSC information, or comprises FL signal information and SSC information, or comprises FL signal information, FSC information, and SSC information, or comprises FL signal information and other optical signal information.

Exemplarily, a fluorescence staining and a laser irradiation are used to treat the blood sample to obtain distribution information of the particles in the blood sample that have FL signal information and FSC information.

At step 302, the particles in the blood sample are divided according to pulse width information in the optical signal information, to obtain particle distribution information.

At step 303, particles having a fluorescence signal value less than a preset threshold are filtered out, to obtain filtered particle distribution information.

Figure 16:
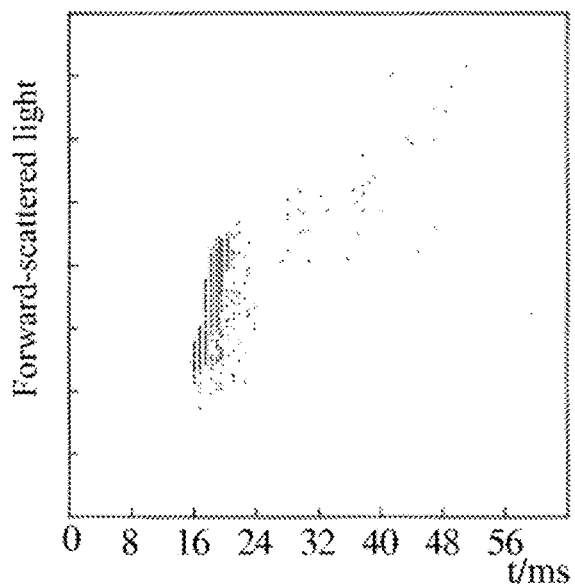
FIG. 16 is a schematic diagram of still another application scenario according to another embodiment of the disclosure.

In the embodiment of the disclosure, the case of occurring two times of the diameter of one particle is taken as an example to illustrate the difference between particle aggregation and other cases (such as particle overlapping). When particle overlapping occurs, usually only two particles overlap, and the probability of more than three particles overlapping is extremely low. Therefore, the FL signal strength correspondingly generated is approximately the sum of FL signal strength of the two particles. However, when particle aggregation occurs, not only the aggregation of two particles leads to the two times of the diameter of one particle, but the aggregation of eight particles also leads to the two times of the diameter of one particle. On average, it is about 5 particles' aggregation leading to the two times of the diameter of one particle, and the corresponding FL signal strength is also five times the FL strength of one particle on average. Therefore, the FL strength caused by particle aggregation may be greater than the FL signal strength generated in other cases such as particle overlapping. Therefore, with the limitation on FL signal strength, the interference of other cases (such as particle overlap) to the actual particle distribution information counted in case of particle aggregation can be eliminated. Therefore, for the above-mentioned multiple-particle region, for example, the above-mentioned region with a pulse width greater than 25 ms, particles having a fluorescence signal value less than a preset threshold may be filtered out. Certainly, for the single-particle region, such as the above-mentioned region with a pulse width less than 25 ms, particles having a fluorescence signal value less than the preset threshold may also be filtered out, but there will be fewer particles having a fluorescence signal value less than the preset threshold in this region. For the multiple-particle region in the scattergram of FIG. 6, after the particles having a fluorescence signal value less than the preset threshold are filtered out, the filtered particle distribution information may be shown in FIG. 16, where the abscissa is the pulse width and is measured in ms, and the ordinate is the forward-scattered light.

The preset threshold is an empirical value and is different in different application scenarios. For example, the preset threshold is 3500. Certainly, the preset threshold may be a fixed value, or may vary with samples, and may be set manually or after machine determination.

At step 304, the filtered particle distribution information is corrected according to a preset correction rule.

Correspondingly, in the method for correcting a blood cell parameter provided in the disclosure, the blood sample analyzer performs fluorescence processing and laser processing on a blood sample, determines WBC particle distribution information in the blood sample, and filters out WBC particles having an FL signal value less than a preset threshold of 3500 from the WBC particle distribution information, to obtain filtered WBC particle distribution information; and uses a preset function to process the filtered WBC particle distribution information, which is specifically as follows: A correction coefficient for the filtered WBC particles with pulse width information less than or equal to 25 ms is c=1.0, and a preset function calculation formula for a correction coefficient of the filtered WBC particles with pulse width information greater than 25 ms is c=w−25, where w is a pulse width of a multiple-particle.

In an embodiment, a sample was collected, wherein a reference value for WBCs was 6.72×10^9/L, a count value given by a white blood cell measurement channel was 3.72×10^9/L after measuring by an instrument BC-6000 manufactured by Shenzhen Mindray Bio-Medical Electronics Co., Ltd., and the value obtained from the white blood cell measurement channel is 45% less than the reference value. After microscopic examination, it was confirmed that WBC aggregation occurred in the sample. FIG. 6 shows an example of a fluorescence and forward-scattered light scattergram of a sample in which WBC aggregation occurs. Through calculation, there are 255 particles with a pulse width greater than 25 ms, and the number of filtered particles is 150. The preset function calculation formula c=w−25 is used to correct the number of particles, and the corrected actual number of WBC particles with pulse width information greater than 25 ms is 2170. Correspondingly, the actual number of filtered WBC particles with pulse width information less than or equal to 25 ms, which is 2170, plus the actual number of filtered WBC particles with pulse width information greater than 25 ms, which is 2115, is the actual number of WBC particles in the blood sample, which is 4285, and the corresponding WBC value is 6.73×10^9/L that basically corresponds to the reference value 6.72×10^9/L. In this case, it is considered that the correction is basically right.

The preset correction rule, such as the comprised preset function, is set in consideration of the number of particles that are filtered out and subtracted. For example, the above-mentioned number of particles that are filtered out and subtracted is 255−150=105. This part of particles is filtered out and subtracted and will affect the finally count of particles. Therefore, this factor may be considered when setting the correction rule. Certainly, since the impact is not large, the impact of this part of particles that are filtered out and subtracted may also be ignored in some embodiments. The particles that are filtered out and subtracted may be considered as particles that overlap each other. For particle overlapping, the industry has corresponding calculation rules. These calculation rules may be taken into account when setting the correction rule.

Correspondingly, in another method for correcting a blood cell parameter provided in the disclosure, the blood sample analyzer performs fluorescence processing and laser processing on a blood sample, determines WBC particle distribution information in the blood sample, and filters out WBC particles with an FL signal value less than a preset threshold of 3500 from the WBC particle distribution information, to obtain filtered WBC particle distribution information; sets at least two pulse width ranges, and corrects, correspondingly according to the pulse width ranges, the filtered WBC particle distribution information. A specific process thereof is as follows: Preset pulse width ranges (0, 25), (25, 33), (33, 41), (41, 49), and (49, 57) are used to divide the filtered WBC particle distribution information into six particle distribution information regions; particle distribution information in the pulse width range of 0 ms to 25 ms is determined as particle distribution information of the single-particle region, particle distribution information in the pulse width range of 25 ms to 33 ms is determined as particle distribution information of the double-particle region, particle distribution information in the pulse width range of 33 ms to 41 ms is determined as particle distribution information of the triple-particle region, particle distribution information in the pulse width range of 41 ms to 49 ms is determined as particle distribution information of the quadruple-particle region, particle distribution information in the pulse width range of 49 ms to 57 ms is determined as particle distribution information of the quintuple-particle region, and particle distribution information in the pulse width range of 57 ms to 64 ms is determined as particle distribution information of the sextuple-particle region; and a correction coefficient preset for each pulse width range is acquired, wherein correction coefficients and corresponding pulse width ranges are: (1, single-particle), (5, double-particle), (13, triple-particle), (25, quadruple-particle), (35, quintuple-particle), and (45, sextuple-particle).

In an embodiment, a sample was collected, wherein a reference value for WBCs was 6.72×10^9/L, a count value given by a white blood cell measurement channel was 3.72×10^9/L after measuring by an instrument BC-6000 manufactured by Shenzhen Mindray Bio-Medical Electronics Co., Ltd., and the value obtained from the white blood cell measurement channel is 45% less than the reference value. After microscopic examination, it was confirmed that WBC aggregation occurred in the sample. FIG. 6 shows an example of a fluorescence and forward-scattered light scattergram of a sample in which WBC aggregation occurs. Through counting, the sample has 2115 particles in the single-particle region, 215 particles in the double-particle region, 110 particles in the triple-particle region, 10 particles in the quadruple-particle region, 5 particles in the quintuple-particle region, and 2 particles in the sextuple- and more times-particle region. After filtering and subtraction are performed on the double- and more times-particle regions, the number of filtered WBC particles corresponding to the particle distribution information of the double-particle region is 176, the number of filtered WBC particles corresponding to the particle distribution information of the triple-particle region is 80, the number of filtered WBC particles corresponding to the particle distribution information of the quadruple-particle region is 5, the number of filtered WBC particles corresponding to the particle distribution information of the quintuple-particle region is 2, and the number of filtered WBC particles corresponding to the particle distribution information of the sextuple-particle region is 1. The product of the number of filtered WBC particles in each pulse width range and the corresponding correction coefficient of each pulse width range is calculated, to obtain the actual number of filtered WBC particles corresponding to the particle distribution information of the single-particle region being 2115, the actual number of filtered WBC particles corresponding to the particle distribution information of the double-particle region being 880, the actual number of filtered WBC particles corresponding to the particle distribution information of the triple-particle region being 1040, the actual number of filtered WBC particles corresponding to the particle distribution information of the quadruple-particle region being 125, the actual number of filtered WBC particles corresponding to the particle distribution information of the quintuple-particle region being 70, and the actual number of filtered WBC particles corresponding to the particle distribution information of the sextuple-particle region being 45. Finally, the actual number of WBC particles in the blood sample is the cumulative sum of the corresponding actual number of filtered WBC particles in each pulse width range, which is 4275, and the corresponding WBC value is 6.71×10^9/L that basically corresponds to the reference value 6.72×10^9/L. In this case, it is considered that the correction is basically right.

Similarly, the preset correction rule is set in consideration of the number of particles that are filtered out and subtracted. This part of particles is filtered out and subtracted and will affect the finally count of particles. Therefore, this factor may be considered when setting the correction rule. Certainly, since the impact is not large, the impact of this part of particles that are filtered out and subtracted may also be ignored in some embodiments.

It should be noted that, for the explanation of the same steps or concepts in the embodiment as in other embodiments, reference may be made to the description in the other embodiments, and details are not repeated herein.

According to the method for correcting a blood cell parameter provided in the embodiment of the disclosure, optical signal information of particles in a blood sample is acquired, the particles in the blood sample are divided according to pulse width information in the optical signal information, to obtain particle distribution information, and finally the particle distribution information is corrected according to a preset correction rule, to obtain particle distribution information after the correction. In this way, the particle distribution information in the blood sample is corrected according to the preset correction rule, which solves the problem that the number of blood cells is inaccurate due to particle overlapping when counting blood cells in the related art, improves the accuracy of counting blood cells, simplifies the operation process of counting blood cells, and improves the intelligence level of a blood cell count device.

Figure 17:
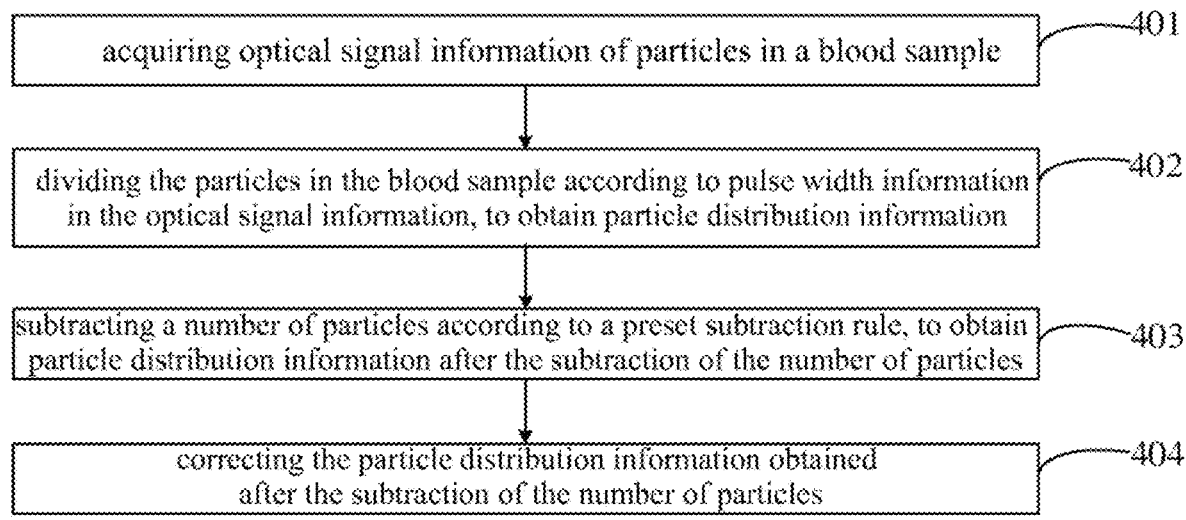
FIG. 17 is a schematic flowchart of still another method for correcting a blood cell parameter according to another embodiment of the disclosure.

Based on the foregoing embodiments, an embodiment of the disclosure provides a method for correcting a blood cell parameter that is applied to a blood sample analyzer and mainly used for a case where aggregation and overlapping exist in cell samples. As shown in FIG. 17, the method comprises steps 401 to 403.

At step 401, optical signal information of particles in a blood sample is acquired.

At step 402, the particles in the blood sample are divided according to pulse width information in the optical signal information, to obtain particle distribution information.

At step 403, a number of particles is subtracted according to a preset subtraction rule, to obtain particle distribution information after the subtraction of the number of particles.

In the embodiment of the disclosure, the preset subtraction rule is determined according to characteristics of particle overlapping. Two times of the diameter of one particle is taken as an example to explain the reason why a number of particles needs to be subtracted according to the preset subtraction rule: when two particles overlap, a pulse width generated is about 1.5 times of the pulse width of one particle. However, when particle aggregation occurs, the particle aggregation of two to eight particles can lead to two times of the pulse width of one particle, and a corresponding pulse width generated is also 1.5 times of the pulse width of one particle. Therefore, particle overlapping and particle aggregation may be superimposed in terms of pulse width, so that it is necessary to eliminate the interference of particle overlapping to particle counting.

In other embodiments of the disclosure, the step 403 may be implemented by step 403a or step 403b.

At step 403a, the number of particles to be subtracted is determined according to a blood sample volume and the pulse width information, to obtain the particle distribution information after the subtraction of the number of particles.

The number of particles to be subtracted is negatively correlated with the pulse width.

In the embodiment of the disclosure, the number of particles to be subtracted is negatively correlated with the pulse width, that is, the particles to be subtracted vary with the pulse width. For example, the number of particles to be subtracted decreases as the pulse width range increases. For example, in the case of a set blood sample volume, a first pulse width range is (a, b), and corresponds to a set number of particles that needs to be subtracted, for example, a first number of particles to be subtracted; a second pulse width range is (b, c), and corresponds to another set number of particles that needs to be subtracted, for example, a second number of particles to be subtracted; a third pulse width range is (c, d), and corresponds to still another set number of particles that needs to be subtracted, for example, a third number of particles to be subtracted, where $a<b<c<d$, and accordingly, the first number of particles to be subtracted is greater than or equal to the second number of particles to be subtracted, and the second number of particles to be subtracted is greater than or equal to the third number of particles to be subtracted.

The blood sample volume is a volume of a blood sample collected for testing. For example, if a 35 microliter (uL) blood sample is collected, the 35 uL blood sample is analyzed, and the number of particles that needs to be subtracted for the 35 uL blood sample is determined according to the pulse width information; and if an 80 uL blood sample is collected, the 80 uL blood sample is analyzed, and the number of particles that needs to be subtracted for the 80 uL blood sample is determined according to the pulse width information. Different sample volumes correspond to different number of particles that needs to be subtracted. In the case of a fixed sample volume, the number of particles that needs to be subtracted may be fixed.

At step 403b, in the case of a predetermined blood sample volume, the number of particles to be subtracted is determined according to the pulse width information, to obtain the particle distribution information after the subtraction of the number of particles.

In the embodiment of the disclosure, a blood sample volume for each test is fixed, such as 80 uL. Therefore, in this case, the number of particles that needs to be subtracted may also be fixed, and the number of particles to be subtracted may be determined directly according to the pulse width information.

At step 404, the particle distribution information obtained after the subtraction of the number of particles is corrected according to a preset correction rule.

In the embodiment of the disclosure, the method for correcting the particle distribution information obtained after the subtraction of the number of particles according to the preset correction rule comprises using a correction coefficient or a preset function to correct the particle distribution information obtained after the subtraction of the number of particles. The specific process is not described herein again. For using the correction coefficient to correct the particle distribution information obtained after the subtraction of the number of particles, reference may be made to steps 203 and 204 (comprising steps 204a and 204b); and for using the preset function to correct the particle distribution information obtained after the subtraction of the number of particles, reference may be made to step 205 (comprising steps 204a and 204b).

When the preset correction rule comprise setting at least two pulse width ranges and correcting the particle distribution information obtained after the subtraction of the number of particles according to each pulse width range, the number of particles to be subtracted is correspondingly determined according to a blood sample volume and the pulse width information; or when the number of particles to be subtracted is determined according to the pulse width information in the case of a predetermined blood sample volume, the corresponding number of particles to be subtracted in each pulse width range may be an empirical value.

When the preset correction rule comprises correspondingly correcting the particle distribution information obtained after the subtraction of the number of particles according to the preset function, the number of particles to be subtracted is correspondingly determined according to a blood sample volume and the pulse width information; or when the number of particles to be subtracted is determined according to the pulse width information in the case of a predetermined blood sample volume, a reference function for determining the number of particles that needs to be subtracted is set corresponding to the pulse width information of the preset function.

The disclosure provides a method for correcting a blood cell parameter that is applied to a scenario where the preset correction rule comprises performing corresponding correction on the particle distribution information obtained after the subtraction of the number of particles according to the preset function. The WBC particle distribution information in the blood sample is obtained by processing the blood sample using the blood sample analyzer. The number of particles that needs to be subtracted, that is, overlapping particles, in WBC particles with pulse width information less than or equal to 25 ms is preset as 0, and a formula for calculating the number of particles that needs to be subtracted, that is, overlapping particles, in WBC particles with pulse width information greater than 25 ms is $\alpha_k=-1.25 w_k+81.25$, where $w_k$ is the $k^{th}$ pulse width value of WBC particles with pulse width information greater than 25 ms, and k ranges from 1 to a total number of pulse widths present in the WBC particles with pulse width information greater than 25 ms.

In an embodiment, a sample was collected, wherein a reference value for WBCs was 6.72×10^9/L, a count value given by a white blood cell measurement channel was 3.72×10^9/L after measuring by an instrument BC-6000 manufactured by Shenzhen Mindray Bio-Medical Electronics Co., Ltd., and the value obtained from the white blood cell measurement channel was 45% less than the reference value. After microscopic examination, it was confirmed that WBC aggregation occurred in the sample. FIG. 6 shows an example of a fluorescence and forward-scattered light scattergram of a sample in which WBC aggregation occurs. Through calculation, there are 342 particles with a pulse width greater than 25 ms, the number of particles is reduced by using the above-mentioned formula $\alpha_k=-1.25 w_k+81.25$, then the preset function calculation formula $c_k=1.1 w_k-30$ is used to correct the number of particles, and the corrected actual number of WBC particles with pulse width information greater than 25 ms is 2170. Correspondingly, the actual number of filtered WBC particles with pulse width information less than or equal to 25 ms, which is 2170, plus the actual number of filtered WBC particles with pulse width information greater than 25 ms, which is 2115, is the actual number of WBC particles in the blood sample, which is 4285, and the corresponding WBC value is 6.73×10^9/L that basically corresponds to the reference value 6.72×10^9/L. In this case, it is considered that the correction is basically right.

The disclosure provides another method for correcting a blood cell parameter that is applied to a scenario where the preset correction rule comprises setting at least two pulse width ranges and performing corresponding correction on the particle distribution information obtained after the subtraction of a number of particles according to each pulse width range. The WBC particle distribution information in the blood sample is obtained by processing the blood sample using the blood sample analyzer. A set of preset pulse width ranges (0, 25), (25, 33), (33, 41), (41, 49), and (49, 57) are used to divide the WBC particle distribution information in the blood sample into six particle distribution information regions; particle distribution information in the pulse width range of 0 ms to 25 ms is determined as particle distribution information of the single-particle region, particle distribution information in the pulse width range of 25 ms to 33 ms is determined as particle distribution information of the double-particle region, particle distribution information in the pulse width range of 33 ms to 41 ms is determined as particle distribution information of the triple-particle region, particle distribution information in the pulse width range of 41 ms to 49 ms is determined as particle distribution information of the quadruple-particle region, particle distribution information in the pulse width range of 49 ms to 57 ms is determined as particle distribution information of the quintuple-particle region, and particle distribution information in the pulse width range of 57 ms to 64 ms is determined as particle distribution information of the sextuple-particle region; and the preset numbers of particles that need to be subtracted, i.e., particles overlapping with each other, are acquired, which are 0, 41, 40, 5, 3, and 1, respectively.

In an embodiment, a sample was collected, wherein a reference value for WBCs was 6.72×10^9/L, a count value given by a white blood cell measurement channel was 3.72×10^9/L after measuring by an instrument BC-6000 manufactured by Shenzhen Mindray Bio-Medical Electronics Co., Ltd., and the value obtained from the white blood cell measurement channel was 45% less than the reference value. After microscopic examination, it was confirmed that WBC aggregation occurred in the sample. FIG. 6 shows an example of a fluorescence and forward-scattered light scattergram of a sample in which WBC aggregation occurs. Particles in the particle distribution information of the single-particle region are counted and the number of the particles is thus obtained as 2115, and particles in each of the particle distribution information of the double-particle region, particle distribution information of the triple-particle region, particle distribution information of the quadruple-particle region, particle distribution information of the quintuple-particle region, and particle distribution information of the sextuple-particle region are respectively counted, and the number of particles in the double-particle region is thus obtained as 215, the number of particles in the triple-particle region is obtained as 110, the number of particles in the quadruple-particle region is obtained as 10, the number of particles in the quintuple-particle region is obtained as 5, and the number of particles in the sextuple- and more times-particle region is obtained as 2, and after subtraction is separately performed based on the above-mentioned numbers to be subtracted, the number of particles in the double-particle region is obtained as 174, the number of particles in the triple-particle region is obtained as 70, the number of particles in the quadruple-particle region is obtained as 5, the number of particles in the quintuple-particle region is obtained as 2, and the number of particles in the sextuple- and more times-particle region is obtained as 1. The number of multiple-particles obtained after the compensation calculation is performed by using the above-mentioned formula is 2160, the total number of particles is 4275, and the corresponding WBC value is 6.72×10^9/L that basically corresponds to the reference value. In this case, it is considered that the correction is right. It should be noted that, for the explanation of the same steps or concepts in the embodiment as in other embodiments, reference may be made to the description in the other embodiments, and details are not repeated herein.

According to the method for correcting a blood cell parameter provided in the embodiment of the disclosure, optical signal information of particles in a blood sample is acquired, the particles in the blood sample are divided according to pulse width information in the optical signal information, to obtain particle distribution information, and finally the particle distribution information is corrected according to a preset correction rule, to obtain particle distribution information after the correction. In this way, the particle distribution information in the blood sample is corrected according to the preset correction rule, which solves the problem that the number of blood cells counted is inaccurate due to particle aggregation when counting blood cells in the related art, improves the accuracy of counting blood cells, simplifies the operation process of counting blood cells, and improves the intelligence level of a blood cell count device.

Figure 18:
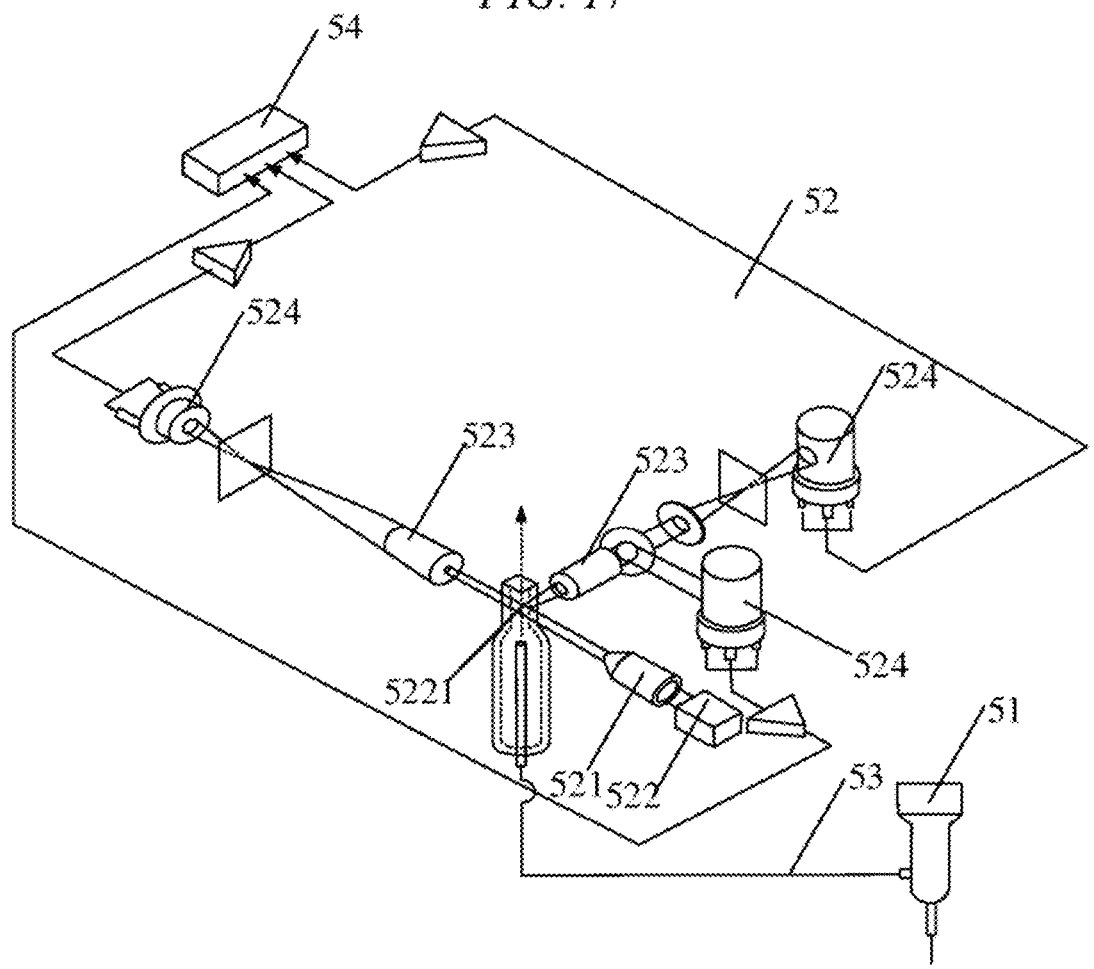
FIG. 18 is a schematic structural diagram of a blood sample analyzer according to an embodiment of the disclosure.

Based on the foregoing embodiments, an embodiment of the disclosure provides a blood sample analyzer 5, which can be applied in the embodiments corresponding to FIGS. 1, 2, 8, 11, 12, 15, and 17. As shown in FIG. 18, the blood sample analyzer may comprise at least one reaction cell 51, an optical detection apparatus 52, a transfer apparatus 53, and a processor 54.

The reaction cell 51 is configured to provide a reaction place for a blood sample and a reagent, to prepare a sample solution. Specifically, the blood sample obtained through blood collection may be diluted and labeled with a fluorescent staining reagent to obtain a sample solution. Common fluorescent staining reagents may be pyronine, acridine orange, thiazole orange, etc.

The optical detection apparatus 52 is configured to perform light irradiation on the blood sample treated with the reagent, that is, the above-mentioned sample solution, collect optical signals generated by particles in the blood sample treated with the reagent under the light irradiation, and convert the optical signals into electrical signals, so as to output optical signal information (namely, optical signal values). The optical signals herein may comprise forward-scattered light (FSC) signals, side-scattered light (SSC) signals, fluorescence-scattered optical signals (SFL, referred to herein as fluorescence signals). The optical detection apparatus 52 may include, but is not limited to, a light source 521 and a sheath flow cell 522 with an orifice 5221. Particles in the blood sample can flow in the sheath flow cell 522 and pass through the orifice 5221 one by one. Light emitted by the light source 521 can be irradiated on the particles in the orifice 5221 and the particles accordingly generate scattered light signals and/or fluorescence signals. The optical detection apparatus 52 may further comprise lens groups 523 that are arranged in front of and on one side of the orifice respectively, photoelectric sensors 524 (such as photodiodes or photomultiplier tubes), and A/D converters. The A/D converters may be arranged in the processor 54 or be provided as a separate element, so that the lens groups 523 can capture corresponding scattered light signals and fluorescence signals, and the photoelectric sensors 524 can convert the captured optical signals (namely, the scattered light signals, the fluorescence signals, etc.) into electrical signals, then the A/D converters process the electrical signals through A/D conversion to obtain digital signals, and the digital signals can be output as the optical signal information.

The transfer apparatus 53 is configured to transfer the blood sample treated with the reagent, that is, the sample solution, in the reaction cell 51 to the optical detection apparatus 52.

The processor 54 is configured to receive and process the optical signal information output by the optical detection apparatus 52, to obtain a cell parameter of the blood sample. The processor 54 is configured to acquire the optical signal information of the particles in the blood sample; divide the particles in the blood sample according to pulse width information in the optical signal information, to obtain particle distribution information; and correct the particle distribution information according to a preset correction rule, to obtain particle distribution information after the correction, wherein the correction rule is related to the pulse width information in the optical signal.

In other embodiments of the disclosure, the optical signal information comprises forward-scattered light information.

In other embodiments of the disclosure, the optical signal information comprises side-scattered light information and/or fluorescence signal information.

In other embodiments of the disclosure, the correction rule stored in the processor 54 comprises:

setting at least two pulse width ranges; and correspondingly correcting the particle distribution information according to each pulse width range.

In other embodiments of the disclosure, the processor 54 is further configured to execute a stored program for correcting a blood cell parameter to implement the following steps:

setting at least two pulse width ranges, and determining a correction coefficient corresponding to each pulse width range, wherein the correction coefficient is positively correlated with the pulse width information; and using each correction coefficient to correct the number of particles in each corresponding pulse width range.

In other embodiments of the disclosure, the correction rule stored in the processor 54 comprises:

performing corresponding correction on the particle distribution information according to a preset function, wherein the preset function is an increasing function using the pulse width information as a variable.

In an embodiment of the disclosure, the correction rule stored in the processor 54 comprises:

determining a correction coefficient according to a preset function; and performing corresponding correction on the particle distribution information according to the correction coefficient, wherein the correction coefficient is positively correlated with the pulse width information.

In other embodiments of the disclosure, the processor 54 is further configured to execute a stored program for correcting a blood cell parameter to implement the following steps:

filtering out particles having a fluorescence signal value less than a preset threshold, to obtain filtered particle distribution information; and correcting, according to the preset correction rule, the filtered particle distribution information.

In other embodiments of the disclosure, the processor 54 is further configured to execute a stored program for correcting a blood cell parameter to implement the following steps:

subtracting a number of particles according to a preset subtraction rule, to obtain particle distribution information after the subtraction of the number of particles; and correcting, according to the preset correction rule, the particle distribution information obtained after the subtraction of the number of particles.

In other embodiments of the disclosure, the preset subtraction rule stored in the processor 54 comprises:

determining the number of particles to be subtracted according to a blood sample volume and the pulse width information, to obtain the particle distribution information after the subtraction of the number of particles; or in the case of a predetermined blood sample volume, determining the number of particles to be subtracted according to the pulse width information, to obtain the particle distribution information after the subtraction of the number of particles.

In other embodiments of the disclosure, the number of particles to be subtracted is negatively correlated with the pulse width information.

In other embodiments of the disclosure, the processor 54 is further configured to execute a stored program for correcting a blood cell parameter to implement the following steps:

outputting the particle distribution information after the correction.

In other embodiments of the disclosure, the processor 54 is further configured to execute a stored program for correcting a blood cell parameter to implement the following steps:

outputting the particle distribution information obtained before the correction and the particle distribution information obtained after the correction.

In other embodiments of the disclosure, after correcting the particle distribution information according to the preset correction rule, the processor 54 is further configured to execute a stored program for correcting a blood cell parameter to implement the following steps:

provide a prompt that the particle distribution information has been corrected; and/or provide a prompt and/or an alert for particle aggregation according to a correction amount.

In other embodiments of the disclosure, the processor 54 is further configured to execute a stored program for correcting a blood cell parameter to implement the following steps:

determining and/or outputting the number of particles according to the particle distribution information after the correction.

In other embodiments of the disclosure, the processor 54 is configured to: identify and remove ghost particles based on the acquired optical signal information of the particles, and then obtain WBC particles.

It should be noted that for the interaction process between the steps implemented by the processor in the embodiments, reference may be made to the embodiments corresponding to FIGS. 1, 2, 8, 11, 12, 15, and 17 and the interaction process in the method for correcting a blood cell parameter provided in the foregoing embodiments, which will not be repeated herein.

According to the blood sample analyzer provided in the embodiments of the disclosure, optical signal information of particles in a blood sample is acquired, the particles in the blood sample are divided according to pulse width information in the optical signal information, to obtain particle distribution information, and finally the particle distribution information is corrected according to a preset correction rule, to obtain particle distribution information after the correction. In this way, the particle distribution information in the blood sample is corrected according to the preset correction rule, which solves the problem that the number of blood cells counted is inaccurate when counting blood cells in the related art, improves the accuracy of counting blood cells, simplifies the operation process of counting blood cells, and improves the intelligence level of a blood cell count device.

Based on the foregoing embodiments, an embodiment of the disclosure provides a computer-readable storage medium storing one or more counting programs, and the one or more counting programs can be executed by one or more processors to implement the following steps:

acquiring optical signal information of particles in a blood sample;

dividing the particles in the blood sample according to pulse width information in the optical signal information, to obtain particle distribution information; and correcting the particle distribution information according to a preset correction rule, to obtain particle distribution information after the correction, and the correction rule is related to the pulse width information in the optical signal information.

In other embodiments of the disclosure, the optical signal information comprises forward-scattered light information.

In other embodiments of the disclosure, the optical signal information comprises side-scattered light information and/or fluorescence signal information.

In other embodiments of the disclosure, the correction rule comprises:

setting at least two pulse width ranges; and performing corresponding correction on the particle distribution information according to each pulse width range.

In other embodiments of the disclosure, the correction rule comprises:

setting at least two pulse width ranges, and determining a correction coefficient corresponding to each pulse width range, wherein each correction coefficient is positively correlated with the pulse width information; and using each correction coefficient to correct the number of particles in each corresponding pulse width range.

In other embodiments of the disclosure, the correction rule further comprises:

performing corresponding correction on the particle distribution information according to a preset function, wherein the preset function is an increasing function using the pulse width information as a variable.

In other embodiments of the disclosure, the correction rule comprises:

determining a correction coefficient according to a preset function; and performing corresponding correction on the particle distribution information according to the correction coefficient, wherein the correction coefficient is positively correlated with the pulse width information.

In other embodiments of the disclosure, the optical signal information comprises fluorescence signal information, and said correcting the particle distribution information according to a preset correction rule comprises:

filtering out particles having a fluorescence signal value less than a preset threshold, to obtain filtered particle distribution information; and correcting, according to the preset correction rule, the filtered particle distribution information.

In other embodiments of the disclosure, said correcting the particle distribution information according to a preset correction rule comprises:

subtracting a number of particles according to a preset subtraction rule, to obtain particle distribution information after the subtraction of the number of particles; and correcting, according to the preset correction rule, the particle distribution information obtained after the subtraction of the number of particles.

In other embodiments of the disclosure, said subtracting a number of particles according to a preset subtraction rule, to obtain particle distribution information after the subtraction of the number of particles comprises:

determining the number of particles to be subtracted according to a blood sample volume and the pulse width information, to obtain the particle distribution information after the subtraction of the number of particles; or in the case of a predetermined blood sample volume, determining the number of particles to be subtracted according to the pulse width information, to obtain the particle distribution information after the subtraction of the number of particles.

In other embodiments of the disclosure, the number of particles to be subtracted is negatively correlated with the pulse width information.

In other embodiments of the disclosure, further comprising:

outputting the particle distribution information after the correction.

In other embodiments of the disclosure, further comprising:

outputting the particle distribution information before and after the correction.

In other embodiments of the disclosure, after correcting the particle distribution information according to the preset correction rule, the following is further comprised:

providing a prompt that the particle distribution information has been corrected; and/or providing a prompt and/or an alert for particle aggregation according to a correction amount.

In other embodiments of the disclosure, the following is further comprised:

determining and/or outputting the number of the particles according to the particle distribution information after the correction.

In other embodiments of the disclosure, after the optical signal information of the particles in the blood sample is acquired, the following is further comprised: identifying and removing ghost particles from the acquired optical signal information of the particles, and then obtaining WBC particles.

It should be noted that for the interaction process between the steps implemented by the processor in the embodiments, reference may be made to the embodiments corresponding to FIGS. 1, 2, 8, 11, 12, 15, and 17 and the interaction process in the method for correcting a blood cell parameter provided in the foregoing embodiments, which will not be repeated herein.

The above descriptions are merely specific embodiments of the disclosure, but the protection scope of the disclosure is not limited thereto. Changes or substitutions readily figured out by those skilled in the art within the technical scope disclosed in the disclosure shall fall within the protection scope of the disclosure. Therefore, the protection scope of the disclosure shall be subject to the protection scope of the claims.

INDUSTRIAL APPLICABILITY

According to the method for correcting a blood cell parameter provided in the embodiments of the disclosure, optical signal information of particles in a blood sample is acquired, the particles in the blood sample are divided according to pulse width information in the optical signal information, to obtain particle distribution information, and finally the particle distribution information is corrected according to a preset correction rule, to obtain particle distribution information after the correction. In this way, the particle distribution information in the blood sample is corrected according to the preset correction rule, which solves the problem that the number of blood cells counted is inaccurate in the case of counting blood cells in the related art, improves the accuracy of counting blood cells, simplifies the operation process of counting blood cells, and improves the intelligence level of a blood cell count device.

What is claimed is:

1. A method for correcting a blood cell parameter, comprising:

acquiring optical signal information of particles in a blood sample;

dividing the particles in the blood sample according to pulse width information in the optical signal information, to obtain particle distribution information; and correcting the particle distribution information according to a preset correction rule, to obtain corrected particle distribution information, wherein the correction rule is related to the pulse width information in the optical signal information and the correction rule is determined according to characteristics of particle overlapping and/or particle aggregation.

2. The method of claim 1, wherein the optical signal information comprises forward-scattered light information, and/or wherein the optical signal information comprises side-scattered light information and/or fluorescence signal information.

3. The method of claim 1, wherein the correction rule comprises:

setting at least two pulse width ranges, and correspondingly correcting the particle distribution information according to each pulse width range.

4. The method of claim 3, wherein the correction rule comprises:

setting at least two pulse width ranges, wherein each pulse width range corresponds to a corresponding correction coefficient, and the correction coefficient is positively correlated with the pulse width information; and using each correction coefficient to correct the number of particles in each corresponding pulse width range.

5. The method of claim 1, wherein the correction rule comprises:

correcting the particle distribution information according to a preset function, wherein the preset function is an increasing function using the pulse width information as a variable.

6. The method of claim 5, wherein the correction rule comprises:

determining a correction coefficient according to the preset function; and correspondingly correcting the particle distribution information according to the correction coefficient, wherein the correction coefficient is positively correlated with the pulse width information.

7. The method of claim 1, wherein the optical signal information comprises fluorescence signal information, and said correcting the particle distribution information according to a preset correction rule comprises:

filtering out each particle having a fluorescence signal value less than a preset threshold, to obtain filtered particle distribution information; and correcting, according to the preset correction rule, the filtered particle distribution information.

8. The method of claim 1, wherein said correcting the particle distribution information according to a preset correction rule comprises:
subtracting a number of particles according to a preset subtraction rule, to obtain particle distribution information after the subtraction of the number of particles; and
correcting, according to the preset correction rule, the particle distribution information obtained after the subtraction of the number of particles.

9. The method of claim 8, wherein the preset subtraction rule comprises:
determining the number of particles to be subtracted according to a blood sample volume and the pulse width information, to obtain the particle distribution information after the subtraction of the number of particles; or
in the case of a predetermined blood sample volume, determining the number of particles to be subtracted according to the pulse width information, to obtain the particle distribution information after the subtraction of the number of particles,
wherein the number of particles to be subtracted is negatively correlated with the pulse width information.

10. The method of claim 1, further comprising:
determining and/or outputting the number of the particles according to the particle distribution information after the correction.

11. The method of claim 1, wherein after the optical signal information of the particles in the blood sample is acquired, the method further comprises:
identifying and removing ghost particles based on the acquired optical signal information of the particles, and then obtaining WBC particles.

12. A blood sample analyzer, comprising:
at least one reaction cell configured to provide a reaction place for a blood sample and a reagent;
an optical detection apparatus configured to perform light irradiation on the blood sample treated with the reagent, collect optical signals generated by particles in the blood sample treated with the reagent under the light irradiation, and convert the optical signals into electrical signals, so as to output optical signal information;
a transfer apparatus configured to transfer the blood sample treated with the reagent in the reaction cell to the optical detection apparatus; and
a processor configured to receive and process the optical signal information output by the optical detection apparatus, so as to obtain a measurement parameter of the blood sample, wherein the processor is further configured to acquire the optical signal information of the particles in the blood sample; divide the particles in the blood sample according to pulse width information in the optical signal information, so as to obtain particle distribution information; and correct the particle distribution information according to a preset correction rule, so as to obtain corrected particle distribution information, wherein the correction rule is related to the pulse width information in the optical signal and the correction rule is determined according to characteristics of particle overlapping and/or particle aggregation.

13. The blood sample analyzer of claim 12, wherein the optical signal information comprises forward-scattered light information, and/or
wherein the optical signal information comprises side-scattered light information and/or fluorescence signal information.

14. The blood sample analyzer of claim 12, wherein the correction rule stored in the processor comprises:
setting at least two pulse width ranges; and
correspondingly correcting the particle distribution information according to each pulse width range.

15. The blood sample analyzer of claim 14, wherein the processor is configured to:
set at least two pulse width ranges, wherein each pulse width range corresponds to a corresponding correction coefficient, and the correction coefficient is positively correlated with the pulse width information; and
use each correction coefficient to correct the number of particles in each corresponding pulse width range.

16. The blood sample analyzer of claim 12, wherein the correction rule stored in the processor comprises:
correcting the particle distribution information according to a preset function, wherein the preset function is an increasing function using the pulse width information as a variable.

17. The blood sample analyzer of claim 14, wherein the correction rule stored in the processor comprises:
determining a correction coefficient according to a preset function; and
correspondingly correcting the particle distribution information according to the correction coefficient, wherein the correction coefficient is positively correlated with the pulse width information.

18. The blood sample analyzer of claim 12, wherein the processor is configured to:
filter out each particle having a fluorescence signal value less than a preset threshold, to obtain filtered particle distribution information; and
correct, according to the preset correction rule, the filtered particle distribution information.

19. The blood sample analyzer of claim 12, wherein the processor is configured to:
subtract a number of particles according to a preset subtraction rule, to obtain particle distribution information after the subtraction of the number of particles; and
correct, according to the preset correction rule, the particle distribution information obtained after the subtraction of the number of particles.

20. The blood sample analyzer of claim 19, wherein the preset subtraction rule stored in the processor comprises:
determining the number of particles to be subtracted according to a blood sample volume and the pulse width information, to obtain the particle distribution information after the subtraction of the number of particles; or
in the case of a predetermined blood sample volume, determining the number of particles to be subtracted according to the pulse width information, to obtain the particle distribution information after the subtraction of the number of particles;
wherein the number of particles to be subtracted is negatively correlated with the pulse width information.

* * * * *